United States Patent
Okugawa et al.

(10) Patent No.: US 7,313,913 B2
(45) Date of Patent: Jan. 1, 2008

(54) EXHAUST GAS PURIFICATION SYSTEM OF INTERNAL COMBUSTION ENGINE

(75) Inventors: Shinichiro Okugawa, Toyota (JP); Kazuo Kobayashi, Nagoya (JP); Hiroshi Haraguchi, Kariya (JP)

(73) Assignee: Denso Corporation, Kariya (JP)

( * ) Notice: Subject to any disclaimer, the term of this patent is extended or adjusted under 35 U.S.C. 154(b) by 29 days.

(21) Appl. No.: 11/077,205

(22) Filed: Mar. 11, 2005

(65) Prior Publication Data

US 2005/0198945 A1    Sep. 15, 2005

(30) Foreign Application Priority Data

Mar. 15, 2004  (JP)  ............... 2004-072911

(51) Int. Cl.
*F01N 3/00*  (2006.01)
(52) U.S. Cl. ............... 60/295; 60/274; 60/278; 60/297; 60/311
(58) Field of Classification Search ............... 60/276, 60/278, 285, 295, 297, 300, 311, 274
See application file for complete search history.

(56) References Cited

U.S. PATENT DOCUMENTS

| | | | |
|---|---|---|---|
| 6,574,956 B1 * | 6/2003 | Moraal et al. ............... | 60/295 |
| 6,594,990 B2 * | 7/2003 | Kuenstler et al. ............ | 60/295 |
| 6,634,345 B2 * | 10/2003 | Yoshizaki et al. ........ | 123/568.12 |
| 6,802,180 B2 * | 10/2004 | Gabe et al. .................. | 60/285 |
| 6,851,258 B2 * | 2/2005 | Kawashima et al. .......... | 60/311 |
| 6,865,885 B2 * | 3/2005 | Kitahara ....................... | 60/297 |
| 6,978,603 B2 * | 12/2005 | Asanuma ...................... | 60/297 |
| 6,978,604 B2 * | 12/2005 | Wang et al. .................. | 60/297 |
| 7,137,248 B2 * | 11/2006 | Schaller ....................... | 60/297 |
| 7,169,364 B2 * | 1/2007 | Ohtake et al. .............. | 422/168 |
| 2004/0103654 A1 | 6/2004 | Ohtake et al. | |
| 2005/0072141 A1 | 4/2005 | Kitahara | |
| 2006/0096280 A1 * | 5/2006 | Zhan et al. ................... | 60/297 |
| 2006/0130465 A1 * | 6/2006 | Sun et al. ..................... | 60/295 |

FOREIGN PATENT DOCUMENTS

| | | |
|---|---|---|
| EP | 1464815 A1 | 10/2004 |
| GB | 2229937 A | 10/1990 |
| JP | 2003-206724 | 7/2003 |

* cited by examiner

*Primary Examiner*—Tu M. Nguyen
(74) *Attorney, Agent, or Firm*—Nixon & Vanderhye P.C.

(57) ABSTRACT

An oxidation catalyst is disposed upstream of a diesel particulate filter (DPF) in an exhaust passage of a diesel engine. An electronic control unit (ECU) operates temperature increasing circuit to combust and eliminate particulate matters deposited on the DPF. The ECU determines execution and stoppage of regeneration of the DPF based on a quantity of the particulate matters deposited on the DPF. The ECU increases an exhaust gas recirculation quantity (EGR quantity) during the regeneration to reduce an intake air quantity from the intake air quantity in a non-regeneration period and to achieve a flow rate of the exhaust gas passing through the DPF suitable for the temperature increase. The ECU corrects a valve opening degree of an EGR control valve based on the sensed intake air quantity to reduce a variation in the exhaust gas flow rate.

14 Claims, 12 Drawing Sheets

EXHAUST GAS PURIFICATION SYSTEM OF INTERNAL COMBUSTION ENGINE

CROSS REFERENCE TO RELATED APPLICATION

This application is based on and incorporates herein by reference Japanese Patent Application No. 2004-72911 filed on Mar. 15, 2004.

BACKGROUND OF THE INVENTION

1. Field of the Invention

The present invention relates to an exhaust gas purification system of an internal combustion engine having a particulate filter in an exhaust passage. Specifically, the present invention relates to temperature increasing control of a particulate filter during regeneration of the particulate filter.

2. Description of Related Art

A known exhaust gas purification system of a diesel engine includes a particulate filter (a diesel particulate filter, DPF) for collecting particulate matters (PM) discharged from the engine. The system increases temperature of the DPF, for instance, over 600° C., when a quantity of the particulate matters deposited on the DPF (a PM deposition quantity) reaches a predetermined value. Thus, the particulate matters deposited on the DPF are combusted and eliminated, and the DPF is regenerated.

At that time, a post-injection, retardation of fuel injection timing, restriction of intake air and the like are usually used as means for increasing the temperature of the DPF. However, deterioration in a fuel cost accompanies the above temperature-increasing means. A combustion speed of the particulate matters increases as the temperature increases. Therefore, the regeneration is finished in a shorter period and the deterioration in the fuel cost due to the regeneration of the DPF is reduced as the temperature increases. However, the particulate matters are combusted rapidly and the DPF temperature increases rapidly if the DPF temperature is too high as shown in FIG. 21. In FIG. 21, a solid line Cpm represents the combustion speed of the deposited particulate matters and a broken line Fc is a degree of the deterioration in the fuel cost due to the regeneration. A sign Th in FIG. 21 represents a threshold value of the DPF temperature Tdpf. In the case where the particulate matters are combusted rapidly and the DPF temperature Tdpf increases rapidly, there is a possibility that the DPF is damaged or an oxidation catalyst supported by the DPF is degraded. A range Ad above the threshold value Th represents a temperature range in which there is a possibility that the DPF is damaged and the oxidation catalyst is degraded. In order to inhibit the deterioration in the fuel cost and in order to regenerate the DPF safely, the DPF temperature needs to be maintained near target temperature suitable for the regeneration by performing temperature control.

A technology of a related art disclosed in JP-A-2003-206724 (Patent Document 1) senses the temperature of the exhaust gas upstream or downstream of the DPF with the use of an exhaust gas temperature sensor and the like, and operates the temperature increasing means of the DPF to perform the temperature control so that the sensed temperature converges to the target temperature. The technology of Patent Document 1 performs exhaust gas recirculation (EGR) to reduce exhaust emissions. Generally, in the EGR, an opening degree of an EGR valve is controlled in accordance with operating states in order to achieve an EGR ratio suitable for the reduction of the exhaust emissions (specifically, nitrogen oxides and the particulate matters) for each operating state.

However, if the temperature control is performed to conform the EGR ratio to the target value during the regeneration of the DPF, optimum temperature-increasing performance cannot be obtained. It is because a flow rate of the exhaust gas passing through the DPF is dominant over the temperature-increasing performance. Therefore, there is a possibility that the exhaust gas flow rate becomes larger than a value suitable for the temperature increase if the control for conforming the EGR ratio to the target value is performed. In such a case, a heat amount released from the DPF to the exhaust gas increases and the deterioration in the fuel cost necessary to increase the temperature becomes problematic. A pressure loss at the DPF is changed by the combustion of the deposited particulate matters and the exhaust gas temperature is changed by the temperature-increasing operation during the regeneration. Accordingly, the EGR quantity fluctuates during the regeneration. Therefore, the flow rate of the exhaust gas passing through the DPF tends to vary during the regeneration. Due to the variation in the flow rate of the exhaust gas, the DPF temperature varies largely even if an operating condition is the same.

The DPF temperature is determined mainly by a balance between a heat amount inputted to the DPF (heat transfer from the exhaust gas, reaction heat of hydrocarbon) and a heat amount released from the DPF (heat released to the exhaust gas). It is because the heat amount released from the DPF changes if the flow rate of the exhaust gas passing through the DPF changes even in the case where the heat amount entering the DPF is constant. The DPF temperature Tdpf corresponding to a temperature increase manipulation amount (a post-injection quantity QP) in a state in which the DPF temperature Tdpf is sufficiently stabilized in a stationary state is shown in FIG. 22. Even if the operating conditions such as an engine rotation speed and a fuel injection quantity are constant, the temperature, to which the DPF temperature T converges when the post-injection quantity is "A" shown in FIG. 22, varies in accordance with the flow rate Ve of the exhaust gas passing through the DPF as shown by points B, C, D in FIG. 22. The exhaust gas flow rate Ve increases along an arrow mark Ve in FIG. 22. In the control of the DPF temperature, a relationship between the manipulation amount (or the heat amount inputted by the temperature-increasing means) and the control amount (the DPF temperature Tdpf) is not constant, and the variation is caused. As a result, control accuracy is deteriorated.

Specifically, in the case where the temperature varies to high temperature, the DPF is regenerated at higher temperature than the target temperature. In such a case, there is a possibility that the DPF is damaged by the rapid combustion of the particulate matters. A method of inhibiting the rapid combustion by sensing the temperature variation with an exhaust gas temperature sensor and the like and by feeding back the temperature variation can be employed as a measure. However, in this case, due to a heat capacity of base materials of the DPF and an oxidation catalyst (a diesel oxidation catalyst: DOC) disposed upstream of the DPF, response of the control amount (for instance, temperatures of the exhaust gas upstream and downstream of the DPF or the estimated DPF temperature) with respect to the manipulation amount of the temperature-increasing means is low (for instance, a response time for 63% response is approximately ten seconds). Accordingly, it takes a long time to sense and to correct the variation. Therefore, it is difficult to design a fast-response control system and to quickly correct influences of the temperature variation.

Generally, a variation in the EGR quantity in a non-regeneration period, in which the regeneration is not performed, is reduced by controlling the EGR ratio, intake air oxygen concentration or exhaust gas oxygen concentration to a target value. However, this method cannot be used during a regeneration period, in which the regeneration is performed. Therefore, the variation in the exhaust gas flow rate cannot be inhibited as shown by broken lines in FIG. 22, and the temperature variation cannot be inhibited.

SUMMARY OF THE INVENTION

It is therefore an object of the present invention to improve temperature-increasing performance and to inhibit deterioration of a fuel cost by suitably controlling a flow rate of exhaust gas passing through a diesel particulate filter during regeneration of the diesel particulate filter.

It is another object of the present invention to improve controllability of temperature of a diesel particulate filter and safety during regeneration of the diesel particulate filter by maintaining the temperature of the diesel particulate filter near target temperature. The temperature of the diesel particulate filter is maintained near the target temperature by inhibiting variation in a flow rate of exhaust gas and variation in the temperature during the regeneration.

According to an aspect of the present invention, an exhaust gas purification system of an internal combustion engine includes a particulate filter, deposition quantity estimating means, temperature increasing means and regeneration controlling means. The particulate filter is disposed in an exhaust passage of the engine. The deposition quantity estimating means estimates a quantity of particulate matters deposited on the particulate filter. The temperature increasing means increases temperature of the particulate filter. The regeneration controlling means operates the temperature increasing means to combust and to eliminate the particulate matters deposited on the particulate filter so that the particulate filter is regenerated. The regeneration controlling means includes regeneration determining means, temperature increase controlling means and exhaust gas flow rate controlling means. The regeneration determining means determines execution and stoppage of the regeneration of the particulate filter based on an output of the deposition quantity estimating means. The temperature increase controlling means operates the temperature increasing means to increase the temperature of the particulate filter to target temperature based on a result of the determination performed by the regeneration determining means. The exhaust gas flow rate controlling means changes an intake air quantity in accordance with an operating condition to change a flow rate of exhaust gas passing through the particulate filter when the temperature increase controlling means controls the temperature of the particulate filter to the target temperature based on the result of the determination performed by the regeneration determining means. Thus, the exhaust gas flow rate controlling means inhibits deviation of the temperature of the particulate filter from the target temperature due to a change in the flow rate of the exhaust gas passing through the particulate filter corresponding to the operating condition.

The regeneration controlling means operates the temperature increasing means to combust and to eliminate the deposited particulate matters if the regeneration determining means determines the execution of the regeneration. At that time, the exhaust gas flow rate controlling means changes the intake air quantity in accordance with the operating condition so that the flow rate of the exhaust gas passing through the particulate filter becomes a value suitable for the temperature increase and so that a variation in the flow rate of the exhaust gas is reduced. Thus, temperature-increasing performance is improved so that the temperature of the particulate filter is controlled to the target temperature and deterioration in a fuel cost is inhibited. Meanwhile, a variation in the temperature is inhibited. As a result, temperature controllability and safety during the regeneration can be improved.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENT

Figure 1:
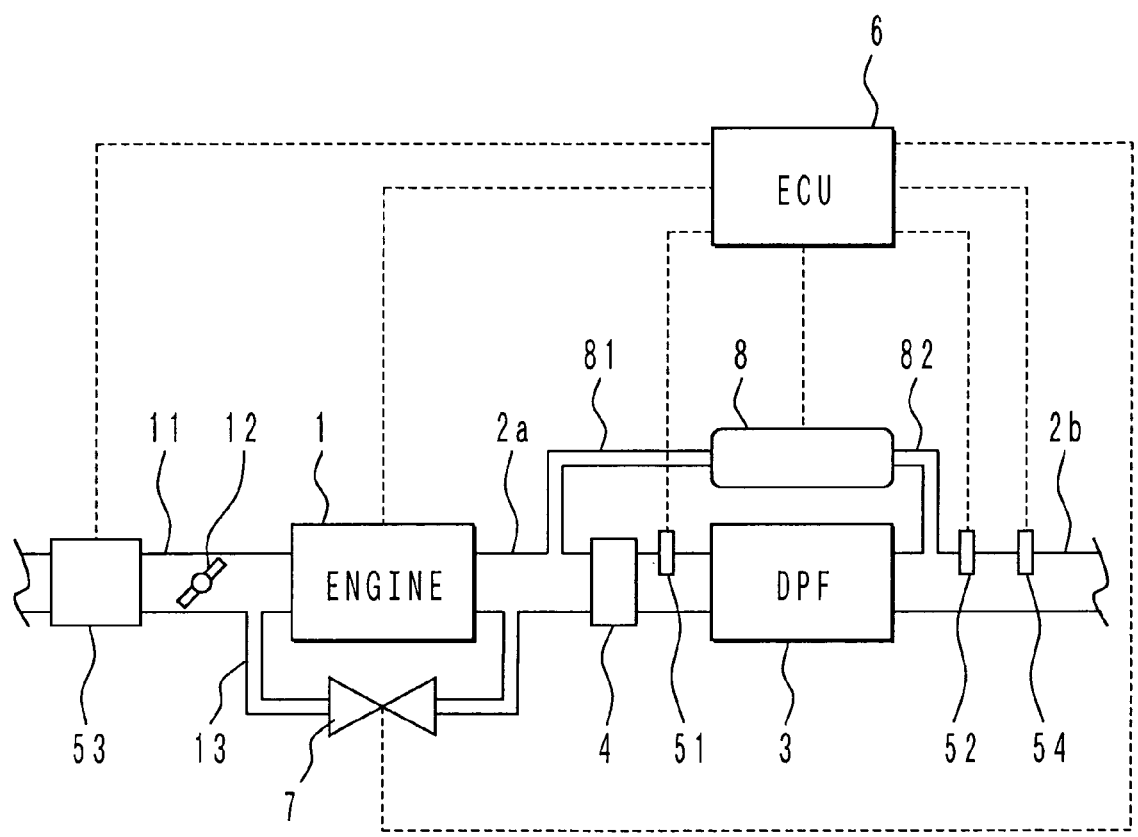
FIG. 1 is a schematic diagram showing an exhaust gas purification system of a diesel engine according to an embodiment of the present invention.

Referring to FIG. 1, an exhaust gas purification system of a diesel engine 1 according to an embodiment of the present invention is illustrated.

A diesel particulate filter (DPF) 3 is disposed between exhaust pipes 2a, 2b, which constitute an exhaust passage 2 of the diesel engine 1. A diesel oxidation catalyst (DOC) 4 is disposed in the exhaust pipe 2a upstream of the DPF 3. The DPF 3 is a ceramic filter having a publicly known structure. For instance, the DPF 3 is made of heat-resistant ceramics such as cordierite and is formed in the shape of a honeycomb structure. An end of each one of multiple cells of the honeycomb structure as gas passages is blocked alternately on an inlet side or on an outlet side of the honeycomb structure. Exhaust gas discharged from the engine 1 flows downstream while passing through porous partition walls of the DPF 3. Meanwhile, particulate matters contained in the exhaust gas are collected in the DPF 3 and gradually deposited in the DPF 3.

The DOC 4 has a publicly known structure, in which an oxidation catalyst is supported on a surface of a ceramic catalyst support provided by a cordierite honeycomb structure and the like. The DOC 4 combusts hydrocarbon (HC), which is supplied to the exhaust passage 2, by catalytic reaction. Thus, the DOC 4 increases temperature of the exhaust gas and temperature of the DPF 3. The DPF 3 may be a metallic filter. An oxidation catalyst may be supported on the DPF 3 or the oxidation catalyst need not be supported on the DPF 3. A system structure, in which the DPF 3 supporting the oxidation catalyst is disposed but no DOC 4 is disposed upstream of the DPF 3, may be employed.

An upstream side exhaust gas temperature sensor 51 and a downstream side exhaust gas temperature sensor 52 are disposed in the exhaust pipes 2a, 2b respectively. The exhaust gas temperature sensors 51, 52 as temperature sensing means are connected with an electronic control unit (ECU) 6. The exhaust gas temperature sensors 51, 52 respectively sense temperature of the exhaust gas entering the DPF 3 and temperature of the exhaust gas discharged from the DPF 3 and output the temperatures to the ECU 6. An air flow meter (an intake air quantity sensor) 53 as intake air quantity sensing means is disposed in an intake pipe 11 of the engine 1 and outputs the intake air quantity to the ECU 6. An intake throttle valve 12 is disposed downstream of the air flow meter 53 in the intake pipe 11. The intake throttle valve 12 changes the intake air quantity responsive to a command of the ECU 6. The intake throttle valve 12 changes a flow passage area of the intake pipe 11 by changing a valve opening degree. Thus, the intake throttle valve 12 regulates the intake air quantity. An air fuel ratio sensor (an A/F sensor) 54 as exhaust gas oxygen concentration sensing means is disposed in the exhaust pipe 2b downstream of the DPF 3. Instead of the A/F sensor 54, an oxygen sensor may be disposed in the exhaust passage 2. Alternatively, the A/F sensor 54 and the oxygen sensor may be used in combination.

The intake pipe 11 of the engine 1 communicates with the exhaust pipe 2a upstream of the DOC 4 through an EGR passage 13 equipped with an EGR (exhaust gas recirculation) control valve 7. The EGR control valve 7 changes an EGR quantity, or a quantity of the exhaust gas recirculated into the intake air through the EGR passage 13, responsive to a command of the ECU 6.

Figure 2A:
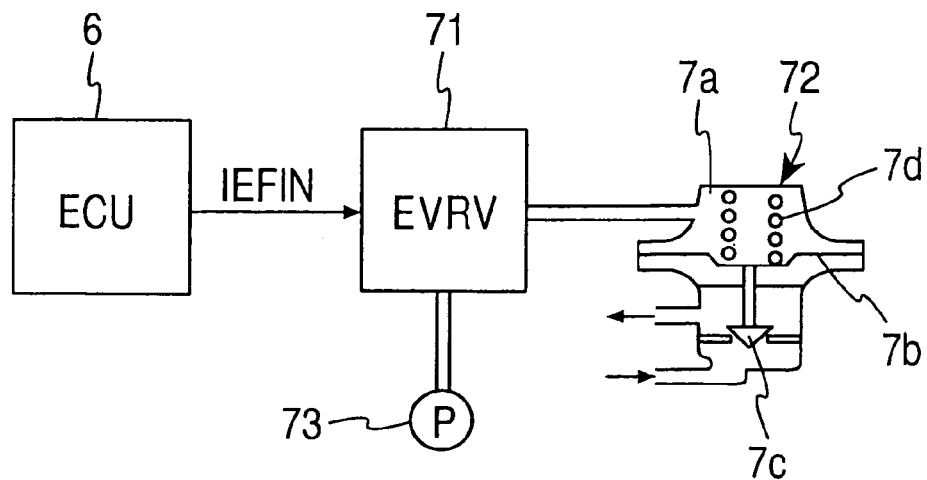
FIG. 2A is a block diagram showing an electronic control unit (ECU) and an exhaust gas recirculation (EGR) control valve according to the embodiment.
Figure 2B:
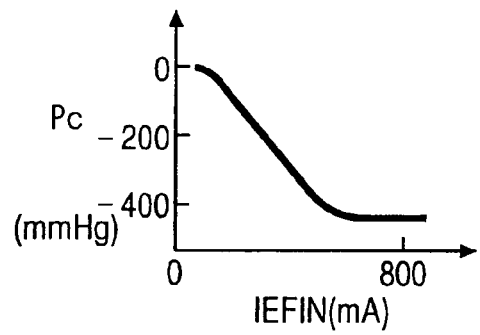
FIG. 2B is a characteristic graph showing a relationship between a control negative pressure and a control current according to the embodiment.
Figure 2C:
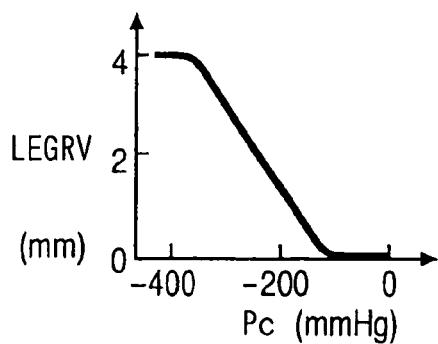
FIG. 2C is a characteristic graph showing a relationship between a lifting amount of the EGR control valve and the control negative pressure according to the embodiment.

The EGR control valve 7 includes an electric vacuum regulation valve (EVRV) 71 and a mechanical valve (EGRV) 72 as shown in FIG. 2A. The EGR control valve 7 regulates a vacuuming amount provided by a vacuum pump 73 in accordance with a control current IEFIN outputted by the ECU 6. Thus, the EGR control valve 7 generates a control negative pressure Pc in a negative-pressure chamber 7a according to the control current IEFIN as shown in FIG. 2B. The mechanical valve 72 includes a diaphragm 7b, which is displaced in accordance with the control negative pressure Pc, and a valve member 7c moving with the diaphragm 7b. The mechanical valve 72 can vary its valve lifting amount LEGRV in accordance with the control current IEFIN as shown in FIG. 2C. A spring 7d is disposed in the negative-pressure chamber 7a for biasing the diaphragm 7b and the valve member 7c in a valve-closing direction. Thus, opening operation and closing operation of the EGR control valve 7 can be performed with quick response and high resolution.

A differential pressure sensor 8 for sensing a differential pressure across the DPF 3 is connected to the exhaust pipes 2a, 2b in order to measure a quantity of the particulate matters collected and deposited in the DPF 3 (a PM deposition quantity). An end of the differential pressure sensor 8 is connected with the exhaust pipe 2a upstream of the DPF 3 through a pressure introduction pipe 81. The other end of the differential pressure sensor 8 is connected with the exhaust pipe 2b downstream of the DPF 3 through a pressure introduction pipe 82. The differential pressure sensor 8 outputs a signal corresponding to the differential pressure across the DPF 3 to the ECU 6.

Other various types of sensors such as an accelerator position sensor or an engine rotation speed sensor are connected to the ECU 6. The ECU 6 calculates an optimum fuel injection quantity, optimum injection timing, an optimum injection pressure and the like in accordance with operating conditions of the engine measured based on sensing signals outputted from the above sensors. Thus, the ECU 6 controls the fuel injection into the engine 1. The ECU 6 performs regeneration control of the DPF 3 based on the operating conditions of the engine 1 and the outputs of the above various sensors. In the regeneration control, the ECU 6 performs a post-injection and the like to increase temperature of the DPF 3 to target temperature. The ECU 6 controls the intake air quantity by regulating the valve opening degree of the intake throttle valve 12. The ECU 6 controls the EGR quantity by regulating the valve opening degree of the EGR control valve 7.

Next, the regeneration of the DPF 3 will be explained. The ECU 6 includes deposition quantity estimating means, temperature increasing means and regeneration controlling means. The deposition quantity estimating means estimates the PM deposition quantity in the DPF 3. The temperature increasing means increases the temperature of the exhaust gas and increases the quantity of the hydrocarbon contained in the exhaust gas to generate reaction heat of the hydrocarbon at the DOC 4. Thus, the temperature increasing means increases the temperature of the DPF 3. The regeneration controlling means regenerates the DPF 3 by operating the temperature increasing means to combust and to eliminate the particulate matters deposited on the DPF 3 when the PM deposition quantity exceeds a predetermined value.

Figure 3:
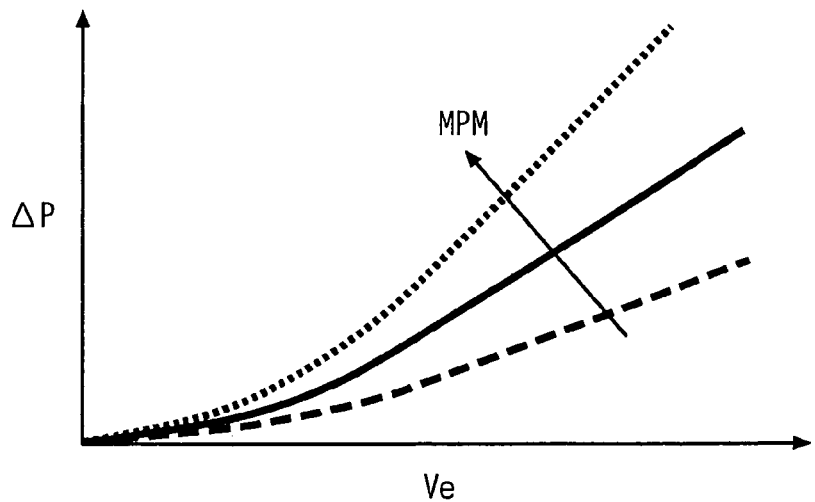
FIG. 3 is a graph showing a relationship between a differential pressure across a diesel particulate filter (DPF) and a quantity of deposited particulate matters relative to an exhaust gas flow rate according to the embodiment.

The deposition quantity estimating means estimates the PM deposition quantity from the differential pressure across the DPF 3 sensed by the differential pressure sensor 8, for instance. The DPF differential pressure ΔP increases as the PM deposition quantity MPM increases in the case where the flow rate Ve of the exhaust gas is constant as shown in FIG. 3. In FIG. 3, the PM deposition quantity MPM increases along an arrow mark MPM. Therefore, the PM deposition quantity can be estimated by measuring the above relationship beforehand. Alternatively, the PM deposition quantity may be estimated by calculating a discharged quantity of the particulate matters based on the engine operating conditions measured based on the outputs of the various sensors and by integrating the discharged quantity. These methods may be used in combination.

More specifically, a post-injection, addition of the fuel into the exhaust gas from a fuel adding device disposed in the exhaust pipe 2a upstream of the DOC 4, retardation of the fuel injection timing or the like is used as the temperature increasing means. An intercooler bypassing operation may be performed as the temperature-increasing means in an engine equipped with an intake air intercooler. The unburned hydrocarbon supplied into the exhaust passage 2 by the above operations generates heat in the oxidation reaction at the DOC 4 or the temperature of the exhaust gas discharged from the engine 1 is increased by the above operations. Thus, the high-temperature exhaust gas is supplied to the DPF 3. One of the above operations may be employed or the multiple operations may be combined as the temperature increasing means.

For instance, temperature (the target temperature) necessary to regenerate the DPF 3 is set at a predetermined constant value (for instance, 600° C.). Alternatively, the target temperature may be changed in accordance with a quantity of the particulate matters remaining during the temperature increase. In this case, the target temperature should be preferably increased as the quantity of the remaining particulate matters (the PM deposition quantity) decreases. For instance, the target temperature is set at 600° C. when the PM deposition quantity exceeds a predetermined value (for instance, 4 g/L), and the target temperature is set at 650° C. when the PM deposition quantity is equal to or less than the predetermined value (for instance, 4 g/L). Alternatively, the target temperature may be changed in multiple stages.

The regeneration controlling means includes regeneration determining means, temperature increase controlling means and exhaust gas flow rate controlling means. The regeneration determining means determines execution and stoppage of the regeneration of the DPF 3 based on the output of the deposition quantity estimating means. The temperature increase controlling means increases the temperature of the DPF 3 to the target temperature by operating the temperature increasing means based on the output of the regeneration determining means. The exhaust gas flow rate controlling means controls the flow rate of the exhaust gas passing through the DPF 3 by changing the intake air quantity based on the output of the regeneration determining means and the operating conditions.

For instance, the regeneration determining means determines the execution of the regeneration if the PM deposition quantity exceeds a predetermined value M1 (for instance, 4 g/L), and determines the stoppage of the regeneration if the PM deposition quantity becomes less than another predetermined value M2 (for instance, 0.5 g/L). Alternatively, the regeneration determining means may determine the execution of the regeneration if the PM deposition quantity exceeds the predetermined value M1 (for instance, 4 g/L), and may determine the stoppage of the regeneration if duration of the continuous execution of the regeneration of the DPF 3 exceeds a predetermined value M3 (for instance, 20 minutes).

The temperature increase controlling means operates the temperature increasing means based on the output of the regeneration determining means. Thus, the temperature increase controlling means increases the DPF temperature to the target temperature to combust and to eliminate the deposited particulate matters. Thus, the DPF 3 is regenerated. More specifically, the temperature increase controlling means corrects the manipulation amount of the temperature increasing means based on a deviation between the DPF temperature and the target temperature when the regeneration determining means determines the execution of the regeneration. The DPF temperature is calculated based on the outputs of the exhaust gas temperature sensors 51, 52. For instance, the temperature increase controlling means can perform proportional-plus-integral feedback control (PI feedback control) of the sensed value of the DPF temperature, state feedback control using history of the change in the temperature and history of the past manipulation amount of the temperature increasing means as state quantities, or open control for switching temperature-increasing amounts, which are adjusted beforehand, for each operating state. These control methods may be used in combination.

The exhaust gas flow rate controlling means changes the intake air quantity based on the output of the regeneration determining means and the operating conditions. More specifically, the exhaust gas flow rate controlling means changes the flow rate of the intake air in accordance with the operating conditions when the temperature increase controlling means controls the DPF temperature to the target temperature. Thus, the exhaust gas flow rate controlling means inhibits the deviation of the DPF temperature from the target temperature, which can be caused by the change in the flow rate of the exhaust gas passing through the DPF 3 corresponding to the operating conditions, when the temperature increase controlling means controls the DPF temperature to the target temperature. The exhaust gas flow rate controlling means includes first intake air quantity controlling means and second intake air quantity controlling means. If the regeneration determining means determines the execution of the regeneration, the first intake air quantity controlling means performs control for reducing the intake air quantity from the value corresponding to the same operating conditions in a non-regeneration period, in which the regeneration is not performed. Thus, the first intake air quantity controlling means reduces the heat amount released to the exhaust gas passing through the DPF 3 to maintain the DPF temperature at relatively high temperature near the target temperature. If the regeneration determining means determines the execution of the regeneration, the second intake air quantity controlling means changes the intake air quantity by changing the opening degree of the EGR control valve 7 based on the output of the air flow meter 53. Thus, the second intake air quantity controlling means achieves the flow rate of the exhaust gas passing through the DPF 3 suitable for the inhibition of the deviation of the DPF temperature from the target temperature.

More specifically, the first intake air quantity controlling means sets a smaller intake air quantity target value in a regeneration period, in which the regeneration is performed, than the value corresponding to the same operating conditions in the non-regeneration period. In order to reduce the intake air quantity, the first intake air quantity controlling means operates the EGR control valve 7 to reduce a pressure loss in the EGR passage 13. Thus, the EGR quantity in the regeneration period is increased from the EGR quantity corresponding to the same operating conditions in the non-regeneration period, and the intake air quantity in the regeneration period is reduced. Alternatively, the intake air quantity in the regeneration period may be reduced from the intake air quantity corresponding to the same operating conditions in the non-regeneration period by operating the intake throttle valve 12 to reduce the flow passage area of the intake pipe 11.

The second intake air quantity controlling means controls the intake air quantity by changing the opening degree of the EGR control valve 7 in accordance with the deviation between the intake air quantity target value and the intake air quantity sensed by the air flow meter 53 so that the intake air quantity coincides with the intake air quantity target value in the regeneration period. The intake air quantity target value in the regeneration period is determined based on the operating conditions. The second intake air quantity controlling means changes an opening degree of the intake throttle valve 12 disposed in the intake pipe 11 to an opening degree target value determined in accordance with the operating conditions. More specifically, the second intake air quantity controlling means increases the opening degree of the EGR control valve 7 if the sensed intake air quantity is greater than the intake air quantity target value, and decreases the opening degree of the EGR control valve 7 if the sensed intake air quantity is smaller than the intake air quantity target value. The first intake air quantity controlling means sets the intake air quantity target value in the regeneration period in accordance with the operating conditions. The intake air quantity target value in the regeneration period is determined based on the engine rotation speed and the fuel injection quantity so that the intake air quantity target value in the regeneration period is less than the intake air quantity target value corresponding to the same operating conditions in the non-regeneration period.

Figure 5:
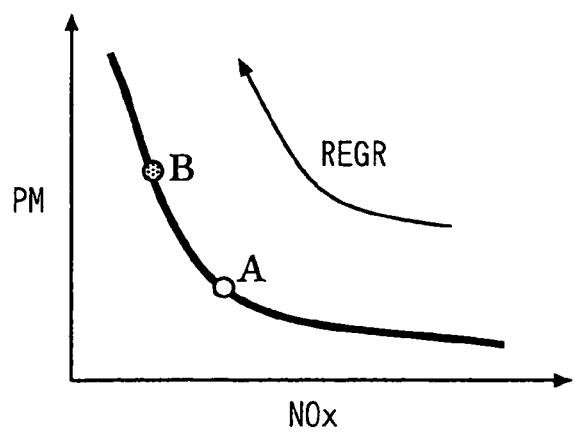
FIG. 5 is a graph showing a relationship between quantities of the particulate matters and nitrogen oxides discharged from the engine relative to an EGR ratio according to the embodiment.

When the regeneration is not performed, the EGR quantity is controlled so that EGR ratio becomes a value (a point "A" in FIG. 5, for instance) minimizing the discharge quantities of the nitrogen oxides (NOx) and the particulate matters (PM) for each operating condition. The EGR ratio increases along an arrow mark REGR in FIG. 5. For instance, oxygen concentration in the exhaust gas is feedback-controlled based on the output of the A/F sensor 54 in the EGR control in the non-regeneration period. However, the temperature increasing performance of the DPF 3 will be deteriorated if the EGR ratio is controlled to the target value during the regeneration.

Figure 4:
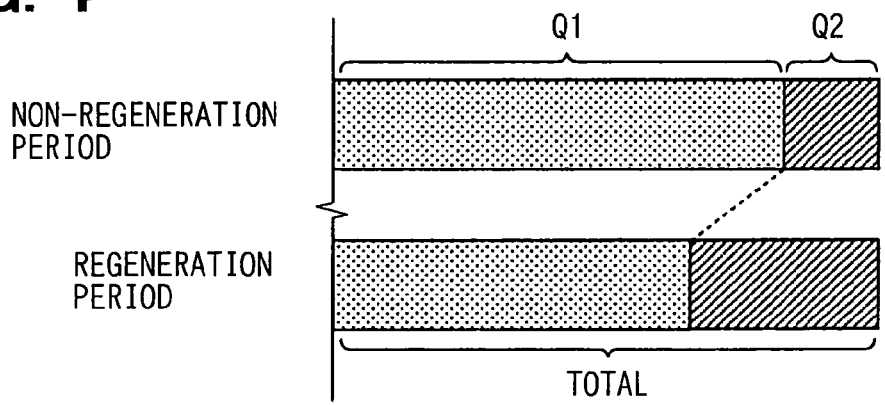
FIG. 4 is a diagram showing a relationship between a quantity of a gas passing through the DPF and an EGR quantity relative to a total exhaust gas quantity according to the embodiment.

Therefore, in the present embodiment, when the regeneration is performed, the first intake air quantity controlling means reduces the flow rate of the exhaust gas passing through the DPF 3 (equal to the intake air quantity) from the flow rate in the non-regeneration period. Thus, the deterioration of the fuel cost due to the temperature-increasing operation in the regeneration period can be inhibited. The total exhaust gas quantity consists of the intake air quantity (Q1) and the EGR quantity (Q2) as shown in FIG. 4. The EGR gas is recirculated into an intake manifold through the EGR passage 13. Accordingly, the quantity of the exhaust gas passing through the DPF 3 coincides with the intake air quantity. Therefore, when the regeneration is performed, the EGR gas quantity in the regeneration period is increased to decrease the intake air quantity from the intake air quantity in the non-regeneration period as shown in FIG. 4. The intake air quantities and the EGR gas quantities in the regeneration period and the non-regeneration period shown in FIG. 4 correspond to the same engine rotation speed and fuel injection quantity. Alternatively, the EGR gas quantity may be increased and the intake air quantity may be decreased by correcting the opening degree of the intake throttle valve 12 toward the closed position.

By performing these operations, the exhaust gas flow rate is decreased and the heat amount released from the DPF 3 is decreased. Meanwhile, the high-pressure EGR gas enters cylinders in an intake stroke and increases the temperature of the exhaust gas. These effects increases the DPF temperature from the temperature corresponding to the same operating conditions in the non-regeneration period. In this case, the nitrogen oxides NOx discharged form the engine 1 decrease and the particulate matters (PM) discharged from the engine 1 increase since the EGR ratio increases to a point B in FIG. 5. However, the particulate matters are combusted and eliminated since the regeneration is being performed and the DPF temperature has been increased. Accordingly, the particulate matters are not discharged to the atmosphere.

Figure 6:
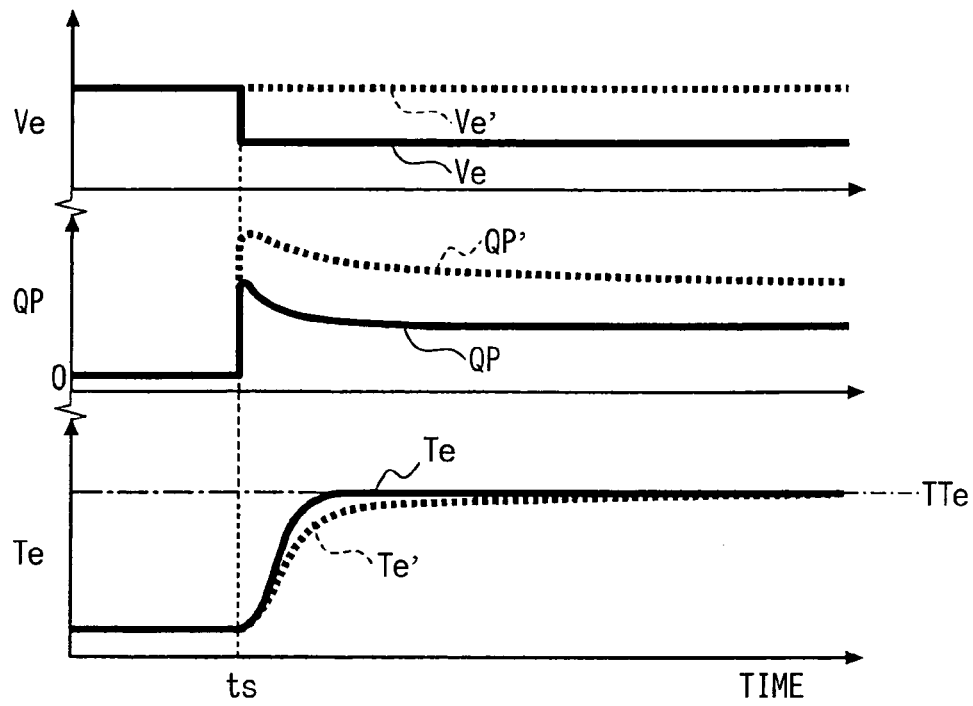
FIG. 6 is a graph showing effects of first intake air quantity controlling means according to the embodiment.

Next, effects of the first intake air quantity controlling means will be explained based on FIG. 6. The results of the PI feedback control for converging the temperature Te of the exhaust gas upstream of the DPF 3 to the target temperature TTe for the regeneration are shown in FIG. 6. The regeneration is started at a time point ts shown in FIG. 6. A solid line Te in FIG. 6 represents the exhaust gas temperature Te in the case where the exhaust gas temperature Te is converged to the target temperature TTe by decreasing the intake air quantity with the first intake air quantity controlling means of the present embodiment. In this case, the exhaust gas flow rate Ve is decreased as shown by a solid line Ve at the time point ts from the exhaust gas flow rate of the relate art shown by a broken line Ve'. A broken line Te' in FIG. 6 represents the exhaust gas temperature Te in the case where the exhaust gas temperature Te is converged to the target temperature TTe by controlling the EGR ratio to the target value as in the related art. A solid line QP represents the post-injection quantity QP in the control of the present embodiment. A broken line QP' in FIG. 6 represents the post-injection quantity QP in the control of the related art. As shown in FIG. 6, an increasing amount of the exhaust gas temperature Te with respect to the temperature-increasing manipulation amount (the post-injection quantity QP in this case) increases as the exhaust gas flow rate Ve decreases. Therefore, the system of the present embodiment can maintain the exhaust gas temperature Te near the target temperature TTe with a smaller fuel cost than that of the related art.

The intake air quantity in the regeneration period changes as the pressure loss at the DPF 3 gradually changes due to the combustion of the particulate matters deposited in the DPF 3 even if the operating state is steady. In the case where the retardation of the fuel injection timing and the post-injection are used together as the temperature-increasing means, the exhaust gas temperature changes depending on a retarding amount or the post-injection quantity. The exhaust gas pressure and the EGR quantity change in accordance with the change in the exhaust gas temperature. Therefore, the intake air quantity varies. If the exhaust gas flow rate increases and the heat amount released from the DPF 3 increases due to the above factors, a heat amount necessary to increase the DPF temperature to the target temperature increases, and the fuel cost is deteriorated. To the contrary, if the exhaust gas flow rate is small, the change in the DPF temperature with respect to the temperature-increasing manipulation amount increases. In this case, there is a possibility that the temperature control accuracy is deteriorated and the temperature is increased excessively. Moreover, a quantity of fresh air suctioned to the engine 1 decreases. As a result, there is a possibility that an output of the engine 1 is reduced or drivability and exhaust emission are deteriorated.

Therefore, in the present embodiment, the second intake air quantity controlling means is employed to perform the control of the EGR gas quantity, in which the intake air quantity is feedback-controlled. For instance, the method of changing the intake air pressure by regulating the EGR quantity with the EGR control valve 7 or the method of changing the flow passage area of the intake pipe by regulating the opening degree of the intake throttle valve 12 can be employed as the means for controlling the intake air quantity. However, the change in the intake air quantity with respect to the change in the valve opening degree of the intake throttle valve 12 increases and the resolution decreases as the intake throttle valve 12 decreases the flow passage area to restrict the intake air. Therefore, the feedback control of the intake air quantity is performed with the use of the EGR control valve 7 having the higher resolution and the quicker response than the intake throttle valve 12, while performing open control of the intake throttle valve 12 having the low resolution in the change of the intake air quantity. Thus, highly accurate and quick-response control of the intake air quantity can be performed.

Figure 7:
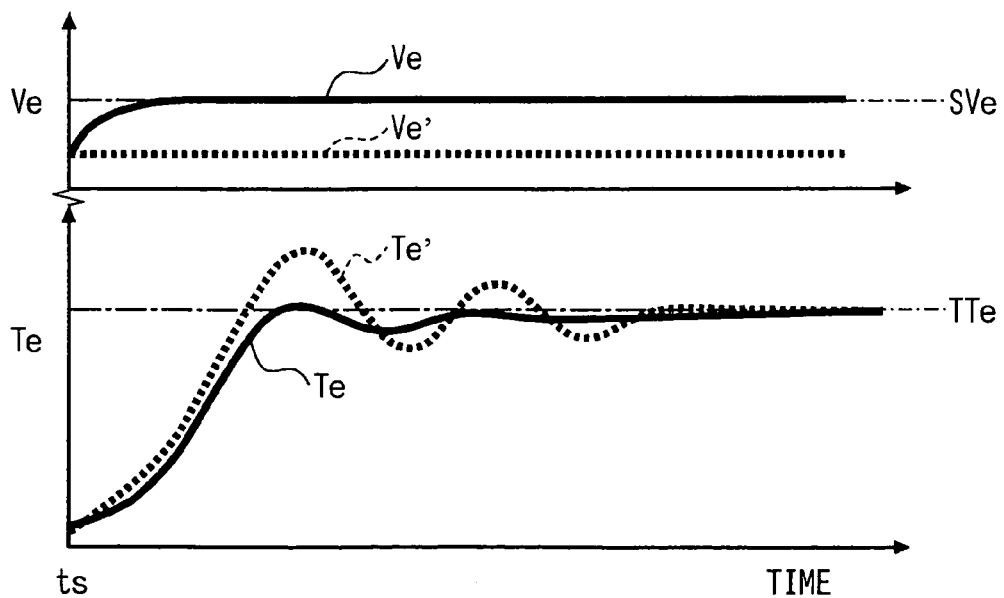
FIG. 7 is a graph showing effects of second intake air quantity controlling means according to the embodiment.

Next, effects of the second intake air quantity controlling means will be explained based on FIG. 7. The results of the PI feedback control for converging the temperature Te of the exhaust gas upstream of the DPF 3 to the target temperature TTe in a state in which the temperature varies to relatively high temperature are shown in FIG. 7. A solid line Te in FIG. 7 represents the exhaust gas temperature Te in the case where the second intake air quantity controlling means of the present embodiment feedback-controls the intake air quantity with the use of the EGR control valve 7. A broken line Te' in FIG. 7 represents the exhaust gas temperature Te in the case where the feedback control of the intake air quantity is not performed as in the related art. As shown by a solid line Ve in FIG. 7, the exhaust gas flow rate Ve is increased to an optimum exhaust gas flow rate SVe when the intake air quantity is feedback-controlled. A broken line Ve' in FIG. 7 represents the exhaust gas flow rate Ve provided when the intake air quantity is not feedback-controlled. As shown in FIG. 7, the exhaust gas temperature Te converges to the target temperature TTe without overshooting in the case where the intake air quantity is feedback-controlled. To the contrary, in the case where the intake air quantity is not feedback-controlled (as in the related art), the temperature-increasing amount with respect to the temperature-increasing manipulation amount is large since the exhaust gas flow rate Ve is small as shown by the broken line Ve' in FIG. 7. As a result, the overshoot occurs and a time for the exhaust gas temperature Te to converge to the target temperature TTe is lengthened correspondingly in the related art as shown by the broken line Te'.

The target value of the EGR ratio is set at the value (the point A in FIG. 5) for simultaneously reducing the quantities of the nitrogen oxides and the particulate matters discharged from the engine 1 in the control of the EGR quantity in the non-regeneration period as explained above. The EGR ratio is measured based on the exhaust gas oxygen concentration sensed based on the output of the A/F sensor 54, and the EGR quantity is controlled to conform the measured EGR ratio to the target value, for instance.

Next, an operation of the ECU 6 according to the present embodiment will be explained based on flowcharts and maps shown in FIGS. 8 to 20.

Figure 8:
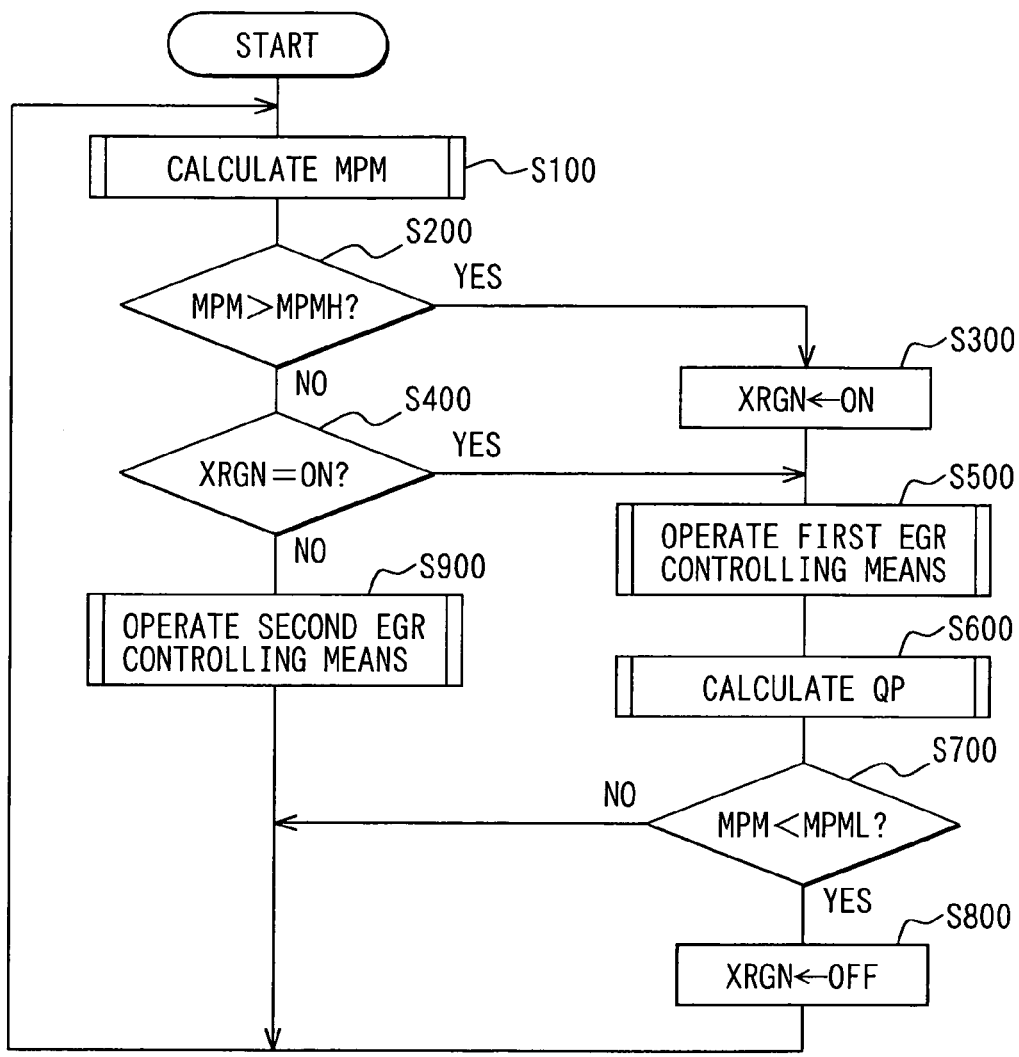
FIG. 8 is a flowchart showing a basic operation of regeneration of the DPF performed by the ECU according to the embodiment.

First, in Step S100 of the flowchart of FIG. 8, the PM deposition quantity MPM of the DPF 3 is measured. The relationship between the flow rate Ve of the exhaust gas passing through the DPF 3 and the differential pressure ΔP across the DPF 3 changes in accordance with the PM deposition quantity MPM as shown in FIG. 3. By using this relationship, the PM deposition quantity MPM is calculated based on the differential pressure ΔP sensed by the differential pressure sensor 8 and the flow rate Ve of the exhaust gas passing through the DPF 3. Alternatively, the quantity of the particulate matters discharged from the engine 1 may be estimated in accordance with the operating conditions, and the PM deposition quantity MPM may be calculated by accumulating the quantity of the discharged particulate matters.

Then, in Step S200, it is determined whether the PM deposition quantity MPM calculated in Step S100 is greater than a regeneration start PM deposition quantity MPMH (the predetermined value M1, for instance, 4 g/L). If the PM deposition quantity MPM is greater than the regeneration start PM deposition quantity MPMH, it is determined that the regeneration of the DPF 3 is necessary, and the ECU 6 proceeds to Step S300. In Step S300, a DPF regeneration flag XRGN is turned on. Then, in Step S500, the regeneration control of the DPF 3 is performed. If the PM deposition quantity MPM is equal to or less than the regeneration start PM deposition quantity MPMH in Step S200, the ECU 6 proceeds to Step S400. In Step S400, it is determined whether the DPF regeneration flag XRGN is on or not. If the DPF regeneration flag XRGN is on, it is determined that the regeneration is being performed and the ECU 6 proceeds to Step S500. In Step S500, the temperature of the DPF 3 is increased. If the flag XRGN is off in Step S400, the ECU 6 proceeds to Step S900, where the temperature increasing operation of the DPF 3 is not performed.

In Step S500, first EGR controlling means performs the EGR control in the regeneration period. The first EGR controlling means is operating means for achieving the flow rate of the exhaust gas, which passes through the DPF 3, suitable for the temperature increase. The first EGR controlling means operates the EGR control valve 7 to converge the intake air quantity to the intake air quantity target value corresponding to the operating conditions. More detailed processing of Step S500 is shown in a flowchart of FIG. 9. First, in Step S510 of the flowchart of FIG. 9, a basic EGRV manipulation amount (a basic control current) IERGNBSE in the regeneration period corresponding to the present operating conditions is calculated. More specifically, as shown by a flowchart of FIG. 10A, the engine rotation speed Ne is inputted in Step S511 and the fuel injection quantity Qf is inputted in Step S512. Then, the basic EGRV manipulation amount IERGNBSE is calculated in Step S513 by using a basic control current IERGNBSE map shown in FIG. 10B. In Step S514, a basic control current a corresponding to the inputted engine rotation speed N1 and fuel injection quantity Q1 is stored as the basic EGRV manipulation amount IERGNBSE.

Figure 9:
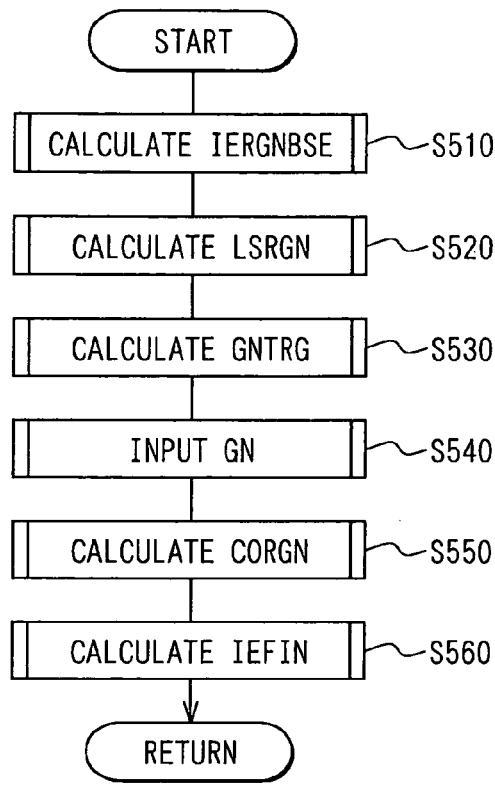
FIG. 9 is a flowchart showing control steps for calculating a manipulation amount of the EGR control valve in a regeneration period according to the embodiment.
Figure 10A:
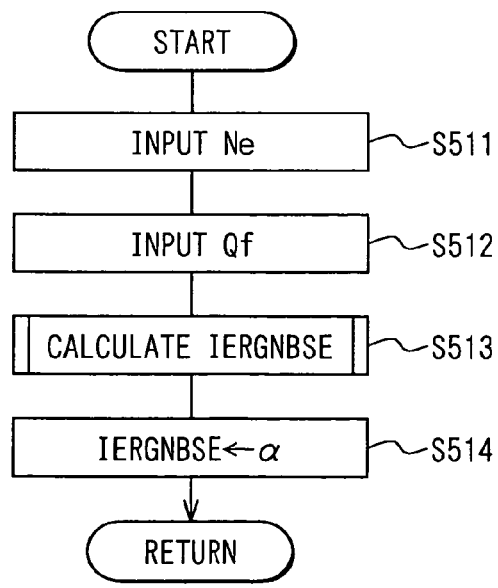
FIG. 10A is a flowchart showing control steps for calculating a basic manipulation amount of the EGR control valve in the regeneration period according to the embodiment.
Figure 10B:
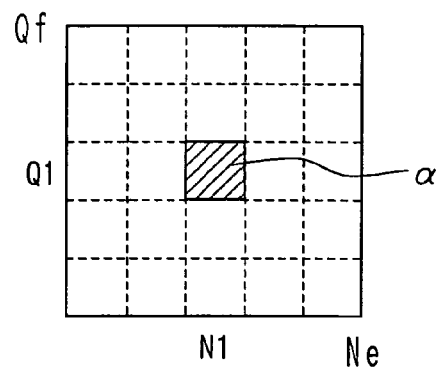
FIG. 10B is a map for calculating the basic manipulation amount corresponding to an operating condition according to the embodiment.
Figure 11A:
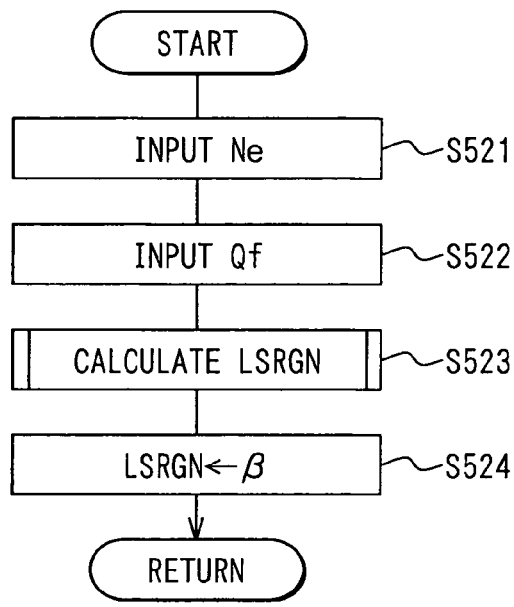
FIG. 11A is a flowchart showing control steps for calculating a valve opening degree of an intake throttle valve in the regeneration period according to the embodiment.
Figure 11B:
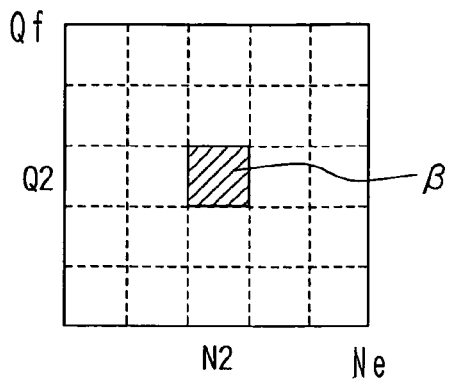
FIG. 11B is a map for calculating the valve opening degree of the intake throttle valve corresponding to the operating condition according to the embodiment.
Figure 12A:
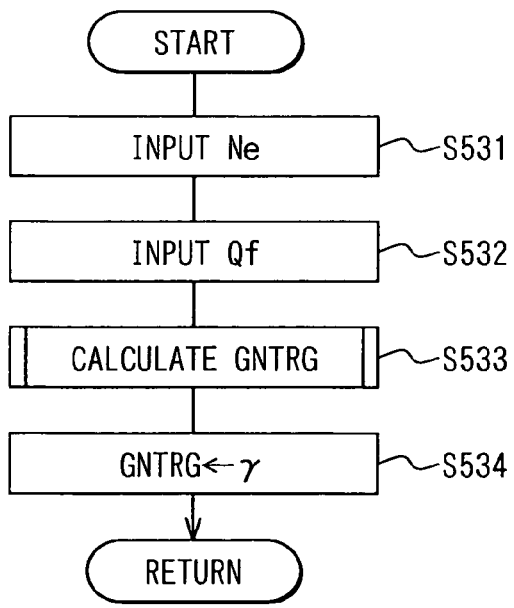
FIG. 12A is a flowchart showing control steps for calculating an intake air quantity target value in the regeneration period according to the embodiment.
Figure 12B:
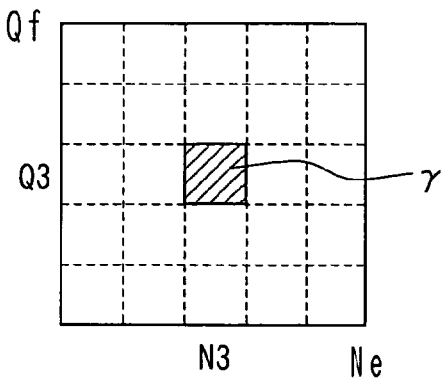
FIG. 12B is a map for calculating the intake air quantity target value corresponding to the operating condition according to the embodiment.

In Step S520 of the flowchart of FIG. 9, an intake throttle valve opening degree LSRGN in the regeneration period corresponding to the present operating conditions is calculated. More specifically, as shown by a flowchart of FIG. 11A, the engine rotation speed Ne is inputted in Step S521, and the fuel injection quantity Qf is inputted in Step S522. Then, the intake throttle valve opening degree LSRGN is calculated in Step S523 by using an intake throttle valve opening degree LSRGN map shown in FIG. 11B. In Step S524, an intake throttle valve opening degree β corresponding to the inputted engine rotation speed N2 and fuel injection quantity Q2 is stored as the intake throttle valve opening degree LSRGN.

In Step S530 of the flowchart of FIG. 9, the intake air quantity target value GNTRG as an ideal value corresponding to the present operating conditions is calculated. Step S530 corresponds to the first intake air quantity controlling means. The intake air quantity target value GNTRG is set smaller than the value corresponding to the same operating conditions in the non-regeneration period so that the temperature increasing performance is improved. More specifically, as shown by a flowchart of FIG. 12A, the engine rotation speed Ne is inputted in Step S531, and the fuel injection quantity Qf is inputted in Step S532. Then, in Step S533, the intake air quantity target value GNTRG is calculated by using an intake air quantity target value GNTRG map shown in FIG. 12B. In Step S534, an intake air quantity target value γ corresponding to the inputted engine rotation speed N3 and fuel injection quantity Q3 is stored as the intake air quantity target value GNTRG. The flow rate of the exhaust gas passing through the DPF 3 coincides with the intake air quantity as explained above. Accordingly, the flow rate of the exhaust gas passing through the DPF 3 can be decreased by decreasing the intake air quantity. Therefore, the intake air quantity target value GNTRG map, in which the target value in the regeneration period is smaller than the target value corresponding to the same operating conditions in the non-regeneration period, is prepared beforehand, and the flow rate of the exhaust gas passing through the DPF 3 (or the intake air quantity) is controlled to the value suitable for the temperature increase.

In Step S540 of the flowchart of FIG. 9, the present intake air quantity GN is inputted based on the output of the air flow meter 53. Then, in Step S550, an intake air quantity correction amount CORGN is calculated in accordance with a deviation between the present intake air quantity GN and the intake air quantity target value GNTRG. In the present embodiment, the intake air quantity correction amount CORGN is calculated by the PI feedback control of the deviation. Step S550 corresponds to the second intake air quantity controlling means. Thus, in Step S550, the variation in the intake air quantity is inhibited by regulating the manipulation amount based on the present intake air quantity GN.

Figure 13:
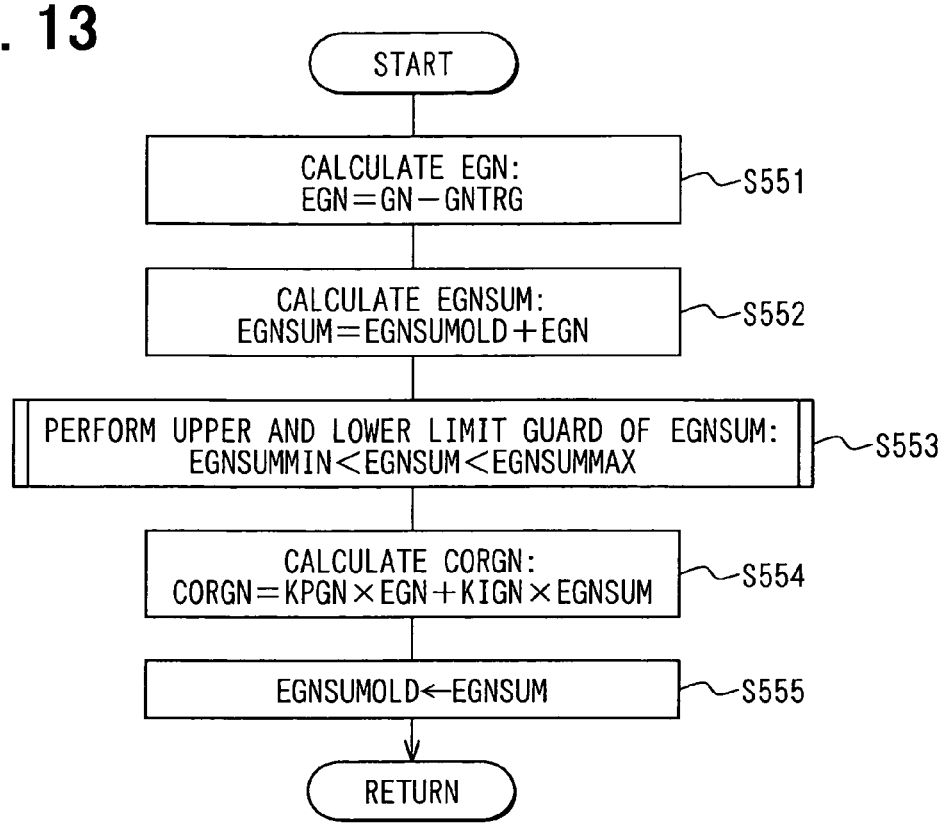
FIG. 13 is a flowchart showing control steps for calculating an intake air quantity correction amount according to the embodiment.
Figure 14:
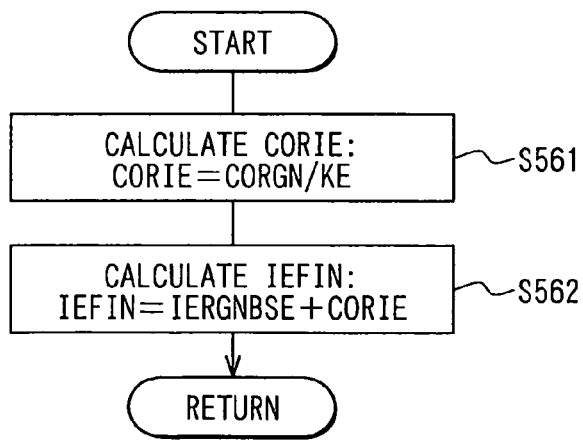
FIG. 14 is a flowchart showing control steps for calculating a final manipulation amount of the EGR control valve according to the embodiment.

More specifically, the deviation EGN between the present intake air quantity GN and the intake air quantity target value GNTRG is calculated in Step S551 of a flowchart shown in FIG. 13, first. Then, in Step S552, a present deviation integration value EGNSUM, or an integration value of the deviation EGN, is calculated from the deviation EGN and a previous deviation integration value EGN-SUMOLD, which is calculated previously. In Step S553, guard of an upper limit and a lower limit of the deviation integration value EGNSUM calculated in Step S552 is performed to prevent excessive integration. More specifically, the deviation integration value EGNSUM is limited between a lower limit guard value EGNSUMMIN and an upper limit guard value EGNSUMMAX in Step S553.

In Step S554, the intake air quantity correction amount CORGN is calculated in accordance with the deviation EGN and the deviation integration value EGNSUM based on a following formula (1). In the formula (1), a sign KPGN represents a proportional term gain, and a sign KIGN is an integral term gain.

$$CORGN = KPGN \times EGN + KIGN \times EGNSUM, \qquad (1)$$

In Step S555, the deviation integration value EGNSUM is stored in the memory as the previous deviation integration value EGNSUMOLD.

In Step S560 of the flowchart shown in FIG. 9, a final EGRV manipulation amount (a final control current) IEFIN is calculated by adding a correction amount corresponding to the intake air quantity correction amount CORGN to the basic EGRV manipulation amount (the basic control current) IERGNBSE. More specifically, an EGRV correction amount CORIE is calculated by dividing the intake air quantity correction amount CORGN by an intake air quantity change KE corresponding to the EGRV manipulation amount in Step S561 of a flowchart shown in FIG. 14, first. Then, in Step S562, the final EGRV manipulation amount (the final control current) IEFIN is calculated by adding the EGRV correction amount CORIE to the basic EGRV manipulation amount (the basic control current) IERGNBSE.

In Step S600 of the flowchart of FIG. 8, the post-injection quantity QP necessary to increase the temperature of the DPF 3 and to maintain the temperature at the temperature necessary for the regeneration is calculated. More specifically, a basic post-injection quantity QPBSE corresponding to the present operating conditions is calculated in Step S610 of a flowchart shown in FIG. 15. More specifically, as shown in a flowchart of FIG. 16A, the engine rotation speed Ne is inputted in Step S611, and the fuel injection quantity Qf is inputted in Step S612. Then, in Step S613, the basic post-injection quantity QPBSE is calculated by using a basic post-injection quantity QPBSE map shown in FIG. 16B. In Step S614, a basic post-injection quantity δ corresponding to the inputted engine rotation speed N4 and fuel injection quantity Q4 is stored as the basic post-injection quantity QPBSE.

Figure 15:
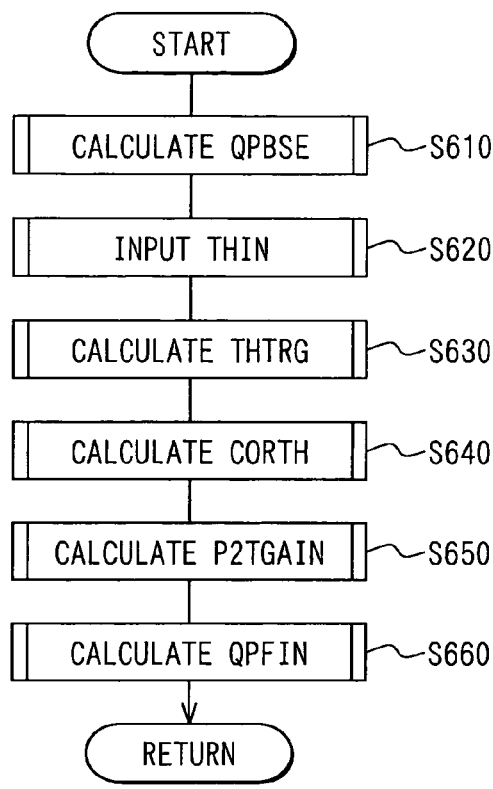
FIG. 15 is a flowchart showing control steps for calculating a post-injection quantity for increasing temperature of the DPF according to the embodiment.
Figure 16A:
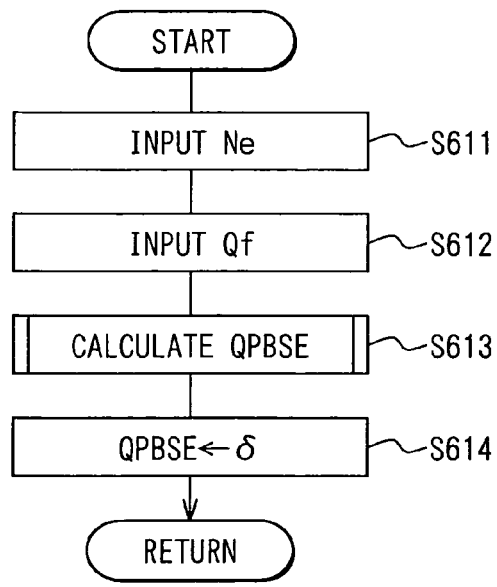
FIG. 16A is a flowchart showing control steps for calculating a basic post-injection quantity according to the embodiment.
Figure 16B:
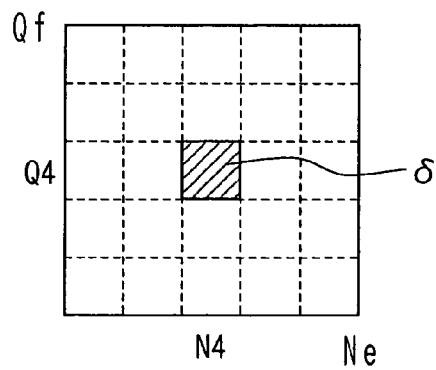
FIG. 16B is a map for calculating the basic post-injection quantity corresponding to the operating condition according to the embodiment.
Figure 17:
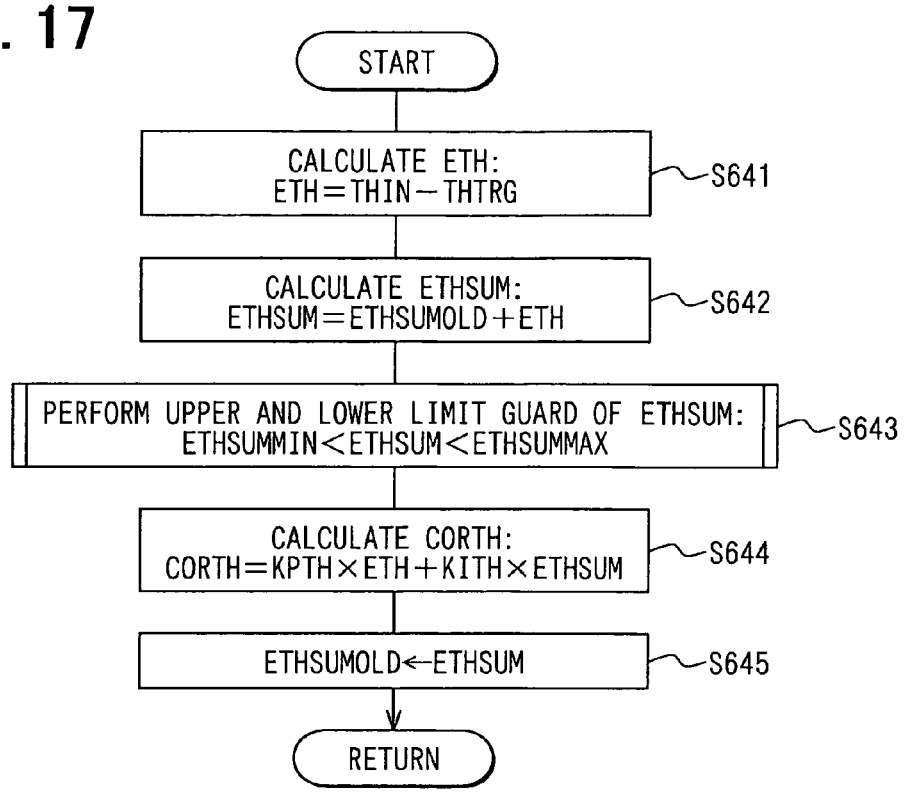
FIG. 17 is a flowchart showing control steps for calculating a temperature correction amount according to the embodiment.

In Step S620 of the flowchart of FIG. 15, the DPF upstream exhaust gas temperature THIN, or the temperature of the exhaust gas upstream of the DPF 3, is inputted based on the output of the upstream side exhaust gas temperature sensor 51. In Step S630, the temperature target value THTRG corresponding to the present operating conditions is calculated. The temperature target value THTRG should be preferably set as high as possible in a range lower than the DPF temperature at which the particulate matters are combusted rapidly. The DPF temperature causing the rapid combustion of the particulate matters varies in accordance with the PM deposition quantity MPM. Therefore, the temperature target value THTRG may be changed in accordance with the PM deposition quantity MPM. For instance, when the PM deposition quantity MPM exceeds a predetermined value (for instance, 4 g/L), the temperature target value THTRG is set at a value (for instance, 600° C.) lower than another temperature target value (for instance, 650° C.) at the time when the PM deposition quantity MPM is equal to or lower than the predetermined value.

In Step S640 of FIG. 15, a temperature correction amount CORTH is calculated in accordance with a deviation ETH between the DPF upstream exhaust gas temperature THIN and the temperature target value THTRG. In the present embodiment, the temperature correction amount CORTH is calculated by performing the PI feedback control of the deviation ETH. More specifically, the deviation ETH between the DPF upstream exhaust gas temperature THIN and the temperature target value THTRG is calculated in Step S641 of a flowchart shown in FIG. 17. Then, in Step S642, a present deviation integration value ETHSUM, or an integration value of the deviation ETH, is calculated from the deviation ETH and a previous deviation integration value ETHSUMOLD, which is calculated previously. In Step S643, guard of an upper limit and a lower limit of the deviation integration value ETHSUM calculated in. Step S642 is performed to prevent excessive integration. More specifically, the deviation integration value ETHSUM is limited between a lower limit guard value ETHSUMMIN and an upper limit guard value ETHSUMMAX in Step S643.

In Step S644, the temperature correction amount CORTH is calculated in accordance with the deviation ETH and the present deviation integration value ETHSUM based on a following formula (2). In the formula (2), a sign KPTH represents a proportional term gain and a sign KITH is an integral term gain.

$$CORTH = KPTH \times ETH + KITH \times ETHSUM, \quad (2)$$

In Step S645, the deviation integration value ETHSUM is stored in the memory as the previous deviation integration value ETHSUMOLD.

In Step S650 of the flowchart of FIG. 15, a temperature change gain P2TGAIN with respect to the change in the post-injection quantity QP corresponding to the operating conditions is calculated. In the present embodiment, the variation in the exhaust gas flow rate is inhibited by performing the feedback control of the intake air as explained above. Therefore, only one temperature change gain P2TGAIN can be determined for each operating condition.

Figure 18A:
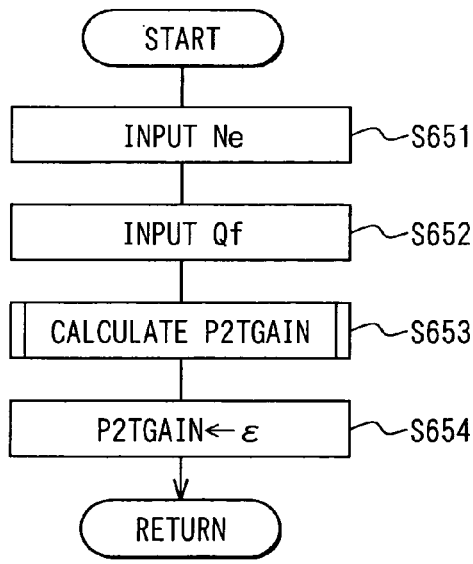
FIG. 18A is a flowchart showing control steps for calculating a temperature change gain according to the embodiment.
Figure 18B:
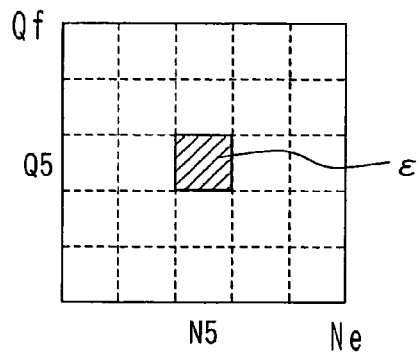
FIG. 18B is a map for calculating the temperature change gain corresponding to the operating condition according to the embodiment.
Figure 19:
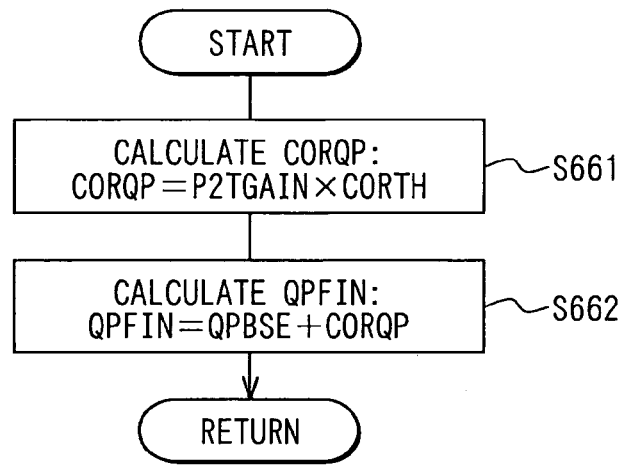
FIG. 19 is a flowchart showing control steps for calculating a final post-injection quantity according to the embodiment.
Figure 20:
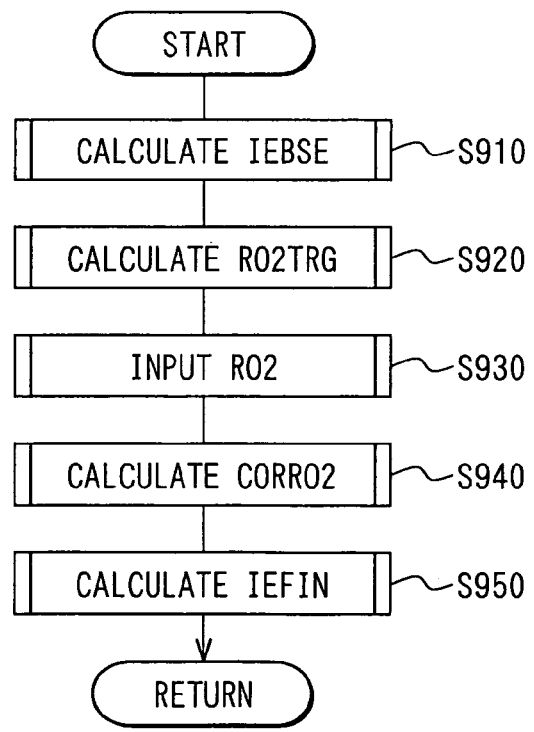
FIG. 20 is a flowchart showing control steps for calculating a manipulation amount of the EGR control valve in a non-regeneration period according to the embodiment.
Figure 21:
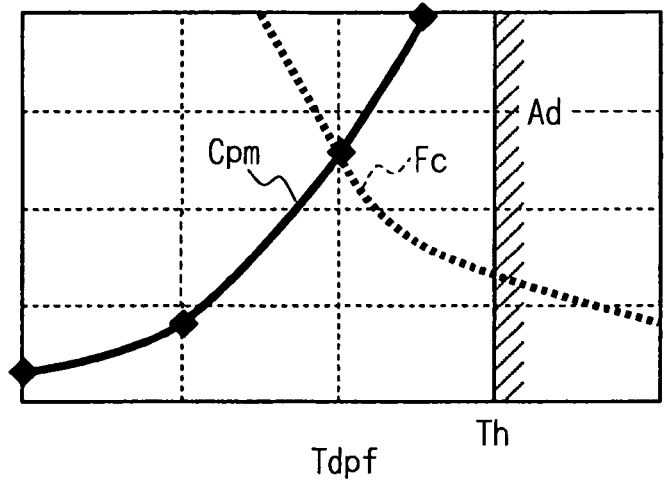
FIG. 21 is a graph showing relationships among DPF temperature during regeneration, a combustion speed of particulate matters and deterioration of a fuel cost due to the regeneration in an exhaust gas purification system of a related art.
Figure 22:
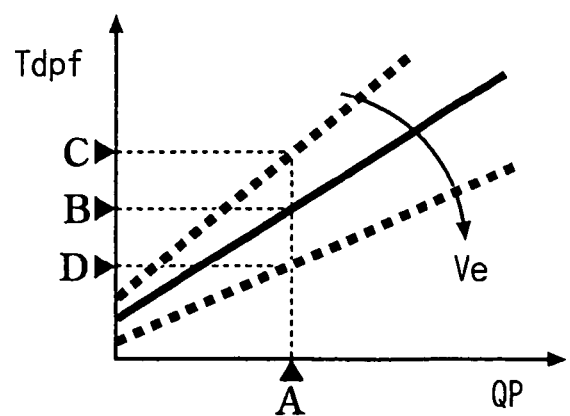
FIG. 22 is a graph showing a relationship between a flow rate of exhaust gas passing through a DPF and a temperature increase of the DPF of the related art.

More specifically, the engine rotation speed Ne is inputted in Step S651 of a flowchart shown in FIG. 18A, and the fuel injection quantity Qf is inputted in Step S652. Then, the temperature change gain P2TGAIN is calculated in Step S653 by using a temperature change gain P2TGAIN map shown in FIG. 18B. Then, in Step S654, a temperature change gain ε corresponding to the inputted engine rotation speed N5 and fuel injection quantity Q5 is stored in the memory as the temperature change gain P2TGAIN.

In Step S660 of the flowchart of FIG. 15, a final post-injection quantity QPFIN is calculated by adding a correction amount corresponding to the temperature correction amount CORTH to the basic post-injection quantity QPBSE. More specifically, a post-injection correction amount CORQP is calculated by multiplying the temperature correction amount CORTH by the temperature change gain P2TGAIN with respect to the temperature correction amount CORTH in Step S661 of a flowchart shown in FIG. 19. Then, in Step S662, the final post-injection quantity QPFIN is calculated by adding the post-injection correction amount CORQP to the basic post-injection quantity QPBSE.

In Step S700 of the flowchart of FIG. 8, it is determined whether the PM deposition quantity MPM calculated in Step S100 is less than a regeneration end PM deposition quantity MPML (the predetermined value M2, for instance, 0.5 g/L). If the PM deposition quantity MPM is less than the regeneration end PM deposition quantity MPML, the end of the regeneration is determined, and the ECU 6 proceeds to Step S800. In Step S800, the DPF regeneration flag XRGN is turned off and the regeneration is ended.

In Step S900, second EGR controlling means performs EGR control in the non-regeneration period. The second EGR controlling means converges the exhaust gas oxygen concentration to an exhaust gas oxygen concentration target value corresponding to the operating conditions. More specifically, a basic EGRV manipulation amount (a basic control current) IEBSE in the non-regeneration period corresponding to the present operating conditions is calculated in Step S910 of a flowchart shown in FIG. 20. Then, in Step S920, an exhaust gas oxygen concentration target value RO2TRG as an ideal value corresponding to the present operating conditions is calculated. In Step S930, the present exhaust gas oxygen concentration RO2 is inputted based on the output of the A/F sensor 54. In Step S940, an exhaust gas oxygen concentration correction amount CORRO2 is calculated in accordance with a deviation between the present exhaust gas oxygen concentration RO2 and the concentration target value RO2TRG. In Step S950, the final EGRV manipulation amount IEFIN is calculated by adding a correction amount corresponding to the exhaust gas oxygen concentration correction amount CORRO2 to the basic EGRV manipulation amount IEBSE.

Thus, in the present embodiment, the EGR control prioritizing the temperature-increasing performance is performed during the regeneration of the DPF 3. The flow rate of the exhaust gas passing through the DPF 3 (or the intake air quantity) is decreased to a value suitable for the temperature increase. Accordingly, the heat amount released to the exhaust gas can be reduced and the higher temperature of the DPF 3 than the temperature in the non-regeneration period can be achieved. Moreover, the EGR quantity is feedback-controlled by using the measured value of the intake air quantity. Thus, the variation in the intake air quantity can be inhibited and the deviation of the DPF temperature from the target temperature can be inhibited. Thus, the DPF temperature can be quickly increased to the target temperature and the can be maintained near the target temperature with good controllability. As a result, the safe and efficient regeneration control of the DPF 3 can be performed.

The present invention should not be limited to the disclosed embodiment, but may be implemented in many other ways without departing from the spirit of the invention.

What is claimed is:

1. A method of purifying gas in an internal combustion engine, the method comprising:
   disposing a particulate filter in an exhaust pipe of the engine;
   estimating a quantity of particulate matters deposited on the particulate filter;
   increasing temperature of the particulate filter; and
   controlling regeneration by controlling the increasing of the temperature of the particulate filter to combust and to eliminate the particulate matters deposited on the particulate filter so that the particulate filter is regenerated, wherein controlling the regeneration includes:
   determining execution and stoppage of the regeneration of the particulate filter based on the estimated quantity of the particulate matters;
   controlling the increasing of the temperature of the particulate filter to increase the temperature of the particulate filter to a target temperature based on the determination of the execution and stoppage of the regeneration of the particulate filter; and
   controlling an exhaust gas flow rate by controlling an intake air quantity to a target intake air quantity decided for each operating condition to control a flow rate of exhaust gas passing through the particulate filter when the temperature of the particulate filter is controlled to the target temperature based on the determination of the execution and stoppage of the regeneration of the particulate filter, whereby deviation of the temperature of the particulate filter from the target temperature due to a change in the flow rate of the exhaust gas passing through the particulate filter corresponding to the operating condition is inhibited;
   wherein the controlling of the exhaust gas flow rate by controlling the intake air quantity is provided by a first intake air quantity controller which reduces the target intake quantity compared to the target intake quantity used in a non-regeneration period, in which the regeneration is not performed, to reduce the intake air quantity from a value corresponding to the same operating condition in the non-regeneration period immediately after the execution of the regeneration is started in the case where the execution of the regeneration is determined, whereby the first intake air quantity controller reduces a heat amount released to the exhaust gas passing through the particulate filter and maintains the temperature of the particulate filter at high temperature near the target temperature;
   an exhaust gas recirculation control valve is disposed in an exhaust gas recirculation passage, through which part of the exhaust gas is recirculated into an intake pipe of the engine, for regulating a quantity of the recirculated exhaust gas; and
   the first intake air quantity controller reduces the intake air quantity by operating the exhaust gas recirculation control valve so that the quantity of the exhaust gas recirculated into the intake pipe is increased from a value corresponding to the same operating condition in the non-regeneration period.

2. A method of purifying gas in an internal combustion engine, the method comprising:
   disposing a particulate filter in an exhaust pipe of the engine;
   estimating a quantity of particulate matters deposited on the particulate filter;
   increasing temperature of the particulate filter; and
   controlling regeneration by controlling the increasing of the temperature of the particulate filter to combust and to eliminate the particulate matters deposited on the particulate filter so that the particulate filter is regenerated, wherein controlling the regeneration includes:
   determining execution and stoppage of the regeneration of the particulate filter based on the estimated quantity of the particulate matters;
   controlling the increasing of the temperature of the particulate filter to increase the temperature of the particulate filter to a target temperature based on the determination of the execution and stoppage of the regeneration of the particulate filter; and
   controlling an exhaust gas flow rate by controlling an intake air quantity to a target intake air quantity decided for each operating condition to control a flow rate of exhaust gas passing through the particulate filter when the temperature of the particulate filter is controlled to the target temperature based on the determination of the execution and stoppage of the regeneration of the particulate filter, whereby deviation of the temperature of the particulate filter from the target temperature due to a change in the flow rate of the exhaust gas passing through the particulate filter corresponding to the operating condition is inhibited;
   sensing oxygen concentration in the exhaust gas;
   disposing an exhaust gas recirculation control valve in an exhaust gas recirculation passage, through which part of the exhaust gas is recirculated into an intake pipe of the engine, for regulating a quantity of the recirculated exhaust gas; and
   controlling an exhaust gas recirculation ratio, oxygen concentration in the exhaust gas or oxygen concentration in the intake air to a target value in accordance with the sensed oxygen concentration when the stoppage of the regeneration is determined;
   wherein the controlling of the exhaust gas flow rate by controlling the intake air quantity is provided by a first intake air quantity controller which reduces the target intake quantity compared to the target intake quantity used in a non-regeneration period, in which the regeneration is not performed, to reduce the intake air quantity from a value corresponding to the same operating condition in the non-regeneration period immediately after the execution of the regeneration is started in the case where the execution of the regeneration is determined, whereby the first intake air quantity controller reduces a heat amount released to the exhaust gas passing through the particulate filter and maintains the temperature of the particulate filter at high temperature near the target temperature.

3. A method of purifying gas in an internal combustion engine, the method comprising:
   disposing a particulate filter in an exhaust pipe of the engine;
   estimating a quantity of particulate matters deposited on the particulate filter;
   increasing temperature of the particulate filter;

controlling regeneration by controlling the increasing of the temperature of the particulate filter to combust and to eliminate the particulate matters deposited on the particulate filter so that the particulate filter is regenerated: wherein controlling the regeneration includes:
  determining execution and stoppage of the regeneration of the particulate filter based on the estimated quantity of the particulate matters;
  controlling the increasing of the temperature of the particulate filter to increase the temperature of the particulate filter to a target temperature based on the determination of the execution and stoppage of the regeneration of the particulate filter; and
  controlling an exhaust gas flow rate by controlling an intake air quantity to a target intake air quantity decided for each operating condition to control a flow rate of exhaust gas passing through the particulate filter when the temperature of the particulate filter is controlled to the target temperature based on the determination of the execution and stoppage of the regeneration of the particulate filter, whereby deviation of the temperature of the particulate filter from the target temperature due to a change in the flow rate of the exhaust gas passing through the particulate filter corresponding to the operating condition is inhibited;
sensing an intake air quantity of the engine; and
disposing an exhaust gas recirculation control valve in an exhaust gas recirculation passage, through which part of the exhaust gas is recirculated into an intake pipe of the engine, for regulating a quantity of the recirculated exhaust gas,
wherein the controlling of the exhaust gas flow rate by controlling the intake air quantity is provided by a first intake air quantity controller which reduces the target intake quantity compared to the target intake quantity used in a non-regeneration period, in which the regeneration is not performed, to reduce the intake air quantity from a value corresponding to the same operating condition in the non-regeneration period immediately after the execution of the regeneration is started in the case where the execution of the regeneration is determined, whereby the first intake air quantity controller reduces a heat amount released to the exhaust gas passing through the particulate filter and maintains the temperature of the particulate filter at high temperature near the target temperature; and
wherein the controlling of the intake air quantity is provided by changing the intake air quantity by changing an opening degree of the exhaust gas recirculation control valve based on the sensed intake air quantity of the engine so that the flow rate of the exhaust gas passing through the particulate filter becomes a value inhibiting deviation of the temperature of the particulate filter from the target temperature when the execution of the regeneration is determined.

4. The method as in claim 3, wherein the intake air quantity is changed by changing the opening degree of the exhaust gas recirculation control valve in accordance with a deviation between an intake air quantity target value in a regeneration period, in which the regeneration is performed, and the sensed intake air quantity, the intake air quantity target value being determined in accordance with the operating condition.

5. The method as in claim 4, wherein the opening degree of the exhaust gas recirculation control valve is increased when the intake air quantity is greater than the intake air quantity target value and the opening degree of the exhaust gas recirculation control valve is decreased when the intake air quantity is less than the intake air quantity target value.

6. A method of purifying gas in an internal combustion engine, the method comprising:
  disposing a particulate filter in an exhaust pipe of the engine;
  estimating a quantity of particulate matters deposited on the particulate filter;
  increasing temperature of the particulate filter; and
  controlling regeneration by controlling the increasing of the temperature of the particulate filter to combust and to eliminate the particulate matters deposited on the particulate filter so that the particulate filter is regenerated, wherein controlling the regeneration includes:
    determining execution and stoppage of the regeneration of the particulate filter based on the estimated quantity of the particulate matters;
    controlling the increasing of the temperature of the particulate filter to increase the temperature of the particulate filter to a target temperature based on the determination of the execution and stoppage of the regeneration of the particulate filter; and
    changing an intake air quantity in accordance with an operating condition to change a flow rate of exhaust gas passing through the particulate filter when the temperature of the particulate filter is controlled to the target temperature based on the result of determining execution and stoppage of the regeneration of the particulate filter, whereby deviation of the temperature of the particulate filter from the target temperature is inhibited due to a change in the flow rate of the exhaust gas passing through the particulate filter corresponding to the operating condition;
  wherein the changing of the exhaust gas flow rate by controlling the intake air quantity is provided by a first intake air quantity controller which reduces the target air quantity compared to the target air quantity used in a non-regeneration period, in which regeneration is not performed, to reduce the intake air quantity from a value corresponding to the same operating condition in the non-regeneration period immediately after the execution of the regeneration is started in the case where the execution of the regeneration is determined, whereby the first intake air quantity controller reduces a heat amount released to the exhaust gas passing through the particulate filter and maintains the temperature of the particulate filter at high temperature near the target temperature; and
  wherein the method further comprises:
  sensing oxygen concentration in the exhaust gas;
  disposing an exhaust gas recirculation control valve in an exhaust gas recirculation passage, through which part of the exhaust gas is recirculated into an intake pipe of the engine, for regulating a quantity of the recirculated exhaust gas; and
  controlling an exhaust gas recirculation ratio, oxygen concentration in the exhaust gas or oxygen concentration in the intake air to an arbitrary target value in accordance with the sensed oxygen concentration when the stoppage of the regeneration is determined.

7. The method as in claim 6, further comprising disposing an intake throttle valve in an intake pipe of the engine for regulating an intake air flow passage area, wherein the first intake air quantity controller reduces the intake air quantity from the value corresponding to the same operating condition in the non-regeneration period by operating the intake throttle valve so that the flow passage area of the intake pipe is reduced.

8. An exhaust gas purification system of an internal combustion engine, the exhaust gas purification system comprising:
a particulate filter disposed in an exhaust pipe of the engine;
deposition quantity estimating means for estimating a quantity of particulate matters deposited on the particulate filter;
temperature increasing means for increasing temperature of the particulate filter; and
regeneration controlling means for operating the temperature increasing means to combust and to eliminate the particulate matters deposited on the particulate filter so that the particulate filter is regenerated, wherein
the regeneration controlling means includes:
regeneration determining means for determining execution and stoppage of the regeneration of the particulate filter based on an output of the deposition quantity estimating means;
temperature increase controlling means for operating the temperature increasing means to increase the temperature of the particulate filter to target temperature based on a result of the determination performed by the regeneration determining means; and
exhaust gas flow rate controlling means for controlling an intake air quantity to a target intake air quantity decided for each operating condition to control a flow rate of exhaust gas passing through the particulate filter when the temperature increase controlling means controls the temperature of the particulate filter to the target temperature based on the result of the determination performed by the regeneration determining means, whereby the exhaust gas flow rate controlling means inhibits deviation of the temperature of the particulate filter from the target temperature due to a change in the flow rate of the exhaust gas passing through the particulate filter corresponding to the operating condition;
the exhaust gas flow rate controlling means includes first intake air quantity controlling means for reducing the target intake air quantity compared to the target intake air quantity used in a non-regeneration period, in which the regeneration is not performed, to reduce the intake air quantity from a value corresponding to the same operating condition in the non-regeneration period immediately after the execution of the regeneration is started in the case where the regeneration determining means determines the execution of the regeneration, whereby the first intake air quantity controlling means reduces a heat amount released to the exhaust gas passing through the particulate filter and maintains the temperature of the particulate filter at high temperature near the target temperature;
an exhaust gas recirculation control valve is disposed in an exhaust gas recirculation passage, through which part of the exhaust gas is recirculated into an intake pipe of the engine, for regulating a quantity of the recirculated exhaust gas; and
the first intake air quantity controlling means reduces the intake air quantity by operating the exhaust gas recirculation control valve so that the quantity of the exhaust gas recirculated into the intake pipe is increased from a value corresponding to the same operating condition in the non-regeneration period.

9. An exhaust gas purification system of an internal combustion engine, the exhaust gas purification system comprising:
a particulate filter disposed in an exhaust pipe of the engine;
deposition quantity estimating means for estimating a quantity of particulate matters deposited on the particulate filter;
temperature increasing means for increasing temperature of the particulate filter;
regeneration controlling means for operating the temperature increasing means to combust and to eliminate the particulate matters deposited on the particulate filter so that the particulate filter is regenerated.: wherein the regeneration controlling means includes:
regeneration determining means for determining execution and stoppage of the regeneration of the particulate filter based on an output of the deposition quantity estimating means;
temperature increase controlling means for operating the temperature increasing means to increase the temperature of the particulate filter to target temperature based on a result of the determination performed by the regeneration determining means; and
exhaust gas flow rate controlling means for controlling an intake air quantity to a target intake air quantity decided for each operating condition to control a flow rate of exhaust gas passing through the particulate filter when the temperature increase controlling means controls the temperature of the particulate filter to the target temperature based on the result of the determination performed by the regeneration determining means, whereby the exhaust gas flow rate controlling means inhibits deviation of the temperature of the particulate filter from the target temperature due to a change in the flow rate of the exhaust gas passing through the particulate filter corresponding to the operating condition;
oxygen concentration sensing means for sensing oxygen concentration in the exhaust gas;
an exhaust gas recirculation control valve disposed in an exhaust gas recirculation passage, through which part of the exhaust gas is recirculated into an intake pipe of the engine, for regulating a quantity of the recirculated exhaust gas; and
non-regeneration period exhaust gas recirculation controlling means for controlling an exhaust gas recirculation ratio, oxygen concentration in the exhaust gas or oxygen concentration in the intake air to an arbitrary target value in accordance with an output of the oxygen concentration sensing means when the regeneration determining means determines the stoppage of the regeneration
wherein the exhaust gas how rate controlling means includes first intake air quantity controlling means for reducing the target intake air quantity compared to the target intake air quantity used in a non-regeneration period, in which the regeneration is not performed, to reduce the intake air quantity from a value corresponding to the same operating condition in the non-regeneration period immediately after the execution of the regeneration is started in the case where the regeneration determining means determines the execution of the regeneration, whereby the first intake air quantity controlling means reduces a heat amount released to the exhaust gas passing through the particulate filter and maintains the temperature of the particulate filter at high temperature near the target temperature.

10. An exhaust gas purification system of an internal combustion engine, the exhaust gas purification system comprising:
   a particulate filter disposed in an exhaust pipe of the engine;
   deposition quantity estimating means for estimating a quantity of particulate matters deposited on the particulate filter;
   temperature increasing means for increasing temperature of the particulate filter;
   regeneration controlling means for operating the temperature increasing means to combust and to eliminate the particulate matters deposited on the particulate filter so that the particulate filter is regenerated, wherein the regeneration controlling means includes:
      regeneration determining means for determining execution and stoppage of the regeneration of the particulate filter based on an output of the deposition quantity estimating means:
      temperature increase controlling means for operating the temperature increasing means to increase the temperature of the particulate filter to target temperature based on a result of the determination performed by the regeneration determining means: and
      exhaust gas flow rate controlling means for controlling an intake air quantity to a target intake air quantity decided for each operating condition to control a flow rate of exhaust gas passing through the particulate filter when the temperature increase controlling means controls the temperature of the particulate filter to the target temperature based on the result of the determination performed by the regeneration determining means, whereby the exhaust gas flow rate controlling means inhibits deviation of the temperature of the particulate filter from the target temperature due to a change in the flow rate of the exhaust gas passing through the particulate filter corresponding to the operating condition intake air quantity sensing means for sensing an intake air quantity of the engine; and
   an exhaust gas recirculation control valve disposed in an exhaust gas recirculation passage, through which part of the exhaust gas is recirculated into an intake pipe of the engine, for regulating a quantity of the recirculated exhaust gas, wherein
   the exhaust gas flow rate controlling means includes first intake air quantity controlling means for reducing the target intake air quantity compared to the target intake air quantity used in a non-regeneration period, in which the regeneration is not performed, to reduce the intake air quantity from a value corresponding to the same operating condition in the non-regeneration period immediately after the execution of the regeneration is started in the case where the regeneration determining means determines the execution of the regeneration, whereby the first intake air quantity controlling means reduces a heat amount released to the exhaust gas passing through the particulate filter and maintains the temperature of the particulate filter at high temperature near the target temperature;
   the first intake air quantity controlling means changes the intake air quantity by changing an opening degree of the exhaust gas recirculation control valve based on an output of the intake air quantity sensing means so that the flow rate of the exhaust gas passing through the particulate filter becomes a value inhibiting deviation of the temperature of the particulate filter from the target temperature when the regeneration determining means determines the execution of the regeneration.

11. The exhaust gas purification system as in claim 10, wherein
   the first intake air quantity controlling means changes the intake air quantity by changing the opening degree of the exhaust gas recirculation control valve in accordance with a deviation between an intake air quantity target value in a regeneration period, in which the regeneration is performed, and the intake air quantity sensed by the intake air quantity sensing means, the intake air quantity target value being determined in accordance with the operating condition.

12. The exhaust gas purification system as in claim 11, wherein
   the first intake air quantity controlling means increases the opening degree of the exhaust gas recirculation control valve when the intake air quantity is greater than the intake air quantity target value and decreases the opening degree of the exhaust gas recirculation control valve when the intake air quantity is less than the intake air quantity target value.

13. An exhaust gas purification system of an internal combustion engine, the exhaust gas purification system comprising:
   a particulate filter disposed in an exhaust pipe of the engine;
   deposition quantity estimating means for estimating a quantity of particulate matters deposited on the particulate filter;
   temperature increasing means for increasing temperature of the particulate filter; and
   regeneration controlling means for operating the temperature increasing means to combust and to eliminate the particulate matters deposited on the particulate filter so that the particulate filter is regenerated,
   wherein the regeneration controlling means includes:
      regeneration determining means for determining execution and stoppage of the regeneration of the particulate filter based on an output of the deposition quantity estimating means;
      temperature increase controlling means for operating the temperature increasing means to increase the temperature of the particulate filter to target temperature based on a result of the determination performed by the regeneration determining means; and
      exhaust gas flow rate controlling means for changing an intake air quantity in accordance with an operating condition to change a flow rate of exhaust gas passing through the particulate filter when the temperature increase controlling means controls the temperature of the particulate filter to the target temperature based on the result of the determination performed by the regeneration determining means, whereby the exhaust gas flow rate controlling means inhibits deviation of the temperature of the particulate filter from the target temperature due to a change in the flow rate of the exhaust gas passing through the particulate filter corresponding to the operating condition;

wherein the exhaust gas flow rate controlling means includes first intake air quantity controlling means for reducing the target air quantity compared to the target air quantity used in a non-regeneration period, in which the regeneration is not performed, to reduce the intake air quantity from a value corresponding to the same operating condition in the non-regeneration period immediately after the execution of the regeneration is started in the case where the regeneration determining means determines the execution of the regeneration, whereby the first intake air quantity controlling means, reduces a heat amount released to the exhaust gas passing through the particulate filter and maintains the temperature of the particulate filter at high temperature near the target temperature; and wherein the exhaust gas purification system further comprises oxygen concentration sensing means for sensing oxygen concentration in the exhaust gas;

an exhaust gas recirculation control valve disposed in an exhaust gas recirculation passage, through which part of the exhaust gas is recirculated into an intake pipe of the engine, for regulating a quantity of the recirculated exhaust gas; and non-regeneration period exhaust gas recirculation controlling means for controlling an exhaust gas recirculation ratio, oxygen concentration in the exhaust gas or oxygen concentration in the intake air to an arbitrary target value in accordance with an output of the oxygen concentration sensing means when the regeneration determining means determines the stoppage of the regeneration.

14. The exhaust gas purification system as in claim 13, further comprising:

an intake throttle valve disposed in an intake pipe of the engine for regulating an intake air flow passage area, wherein the first intake air quantity controlling means reduces the intake air quantity from the value corresponding to the same operating condition in the non-regeneration period by operating the intake throttle valve so that the flow passage area of the intake pipe is reduced.

* * * * *